(12) United States Patent
Walters et al.

(10) Patent No.: US 11,385,942 B2
(45) Date of Patent: Jul. 12, 2022

(54) SYSTEMS AND METHODS FOR CENSORING TEXT INLINE

(71) Applicant: Capital One Services, LLC, McLean, VA (US)

(72) Inventors: Austin Walters, Savoy, IL (US); Fardin Abdi Taghi Abad, Champaign, IL (US); Vincent Pham, Champaign, IL (US); Jeremy Goodsitt, Champaign, IL (US); Anh Truong, Champaign, IL (US); Mark Watson, Urbana, IL (US); Reza Farivar, Champaign, IL (US); Kenneth Taylor, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 83 days.

(21) Appl. No.: 16/181,568

(22) Filed: Nov. 6, 2018

(65) Prior Publication Data
US 2020/0012671 A1    Jan. 9, 2020

Related U.S. Application Data

(60) Provisional application No. 62/694,968, filed on Jul. 6, 2018.

(51) Int. Cl.
*G06F 9/54* (2006.01)
*G06N 20/00* (2019.01)
(Continued)

(52) U.S. Cl.
CPC .............. *G06F 9/541* (2013.01); *G06F 8/71* (2013.01); *G06F 9/54* (2013.01); *G06F 9/547* (2013.01);
(Continued)

(58) Field of Classification Search
CPC .......................... G06F 16/335; G06F 17/2785
See application file for complete search history.

(56) References Cited

U.S. PATENT DOCUMENTS

| 5,911,139 A | 6/1999 | Jain et al. |
| 5,974,549 A | 10/1999 | Golan |

(Continued)

OTHER PUBLICATIONS

Beaulieu-Jones et al., Privacy-preserving generative deep neural networks support 1 clinical data sharing, Jul. 5, 2017, bioRxiv, total pp. 40, http://dx.doi.org/10.1101/159756 (Year: 2017).

(Continued)

*Primary Examiner* — Justin S Lee
(74) *Attorney, Agent, or Firm* — Finnegan, Henderson, Farabow, Garrett & Dunner, L.L.P.

(57) ABSTRACT

Systems and methods for censoring text-based data are provided. In some embodiments a censoring system may include at least one processor and at least one non-transitory memory storing application programming interface instructions. The censoring system may be configured to perform operations comprising storing a target pattern type and a computer-based model for identifying a target data pattern corresponding to a target pattern type within text based data. The censoring system may also be configured to receive text-based data by a server, and to retrieve the stored target pattern type to be censored in the text-based data. The censoring system may be configured to identify within the received text-based data, a target data pattern corresponding to the retrieved target pattern type. The censoring system may be configured to censor target characters within the identified target data pattern, and transmit the censored text-based data to a receiving party.

20 Claims, 21 Drawing Sheets

(51) Int. Cl.

| | | |
|---|---|---|
| *G06F 17/16* | (2006.01) | |
| *G06N 3/04* | (2006.01) | |
| *G06F 11/36* | (2006.01) | |
| *G06N 3/08* | (2006.01) | |
| *G06F 21/62* | (2013.01) | |
| *G06N 5/04* | (2006.01) | |
| *G06F 17/15* | (2006.01) | |
| *G06T 7/194* | (2017.01) | |
| *G06T 7/254* | (2017.01) | |
| *G06T 7/246* | (2017.01) | |
| *G06F 16/2455* | (2019.01) | |
| *G06F 16/22* | (2019.01) | |
| *G06F 16/28* | (2019.01) | |
| *G06F 16/906* | (2019.01) | |
| *G06F 16/93* | (2019.01) | |
| *G06F 16/903* | (2019.01) | |
| *G06F 16/9038* | (2019.01) | |
| *G06F 16/9032* | (2019.01) | |
| *G06F 16/25* | (2019.01) | |
| *G06F 16/335* | (2019.01) | |
| *G06F 16/242* | (2019.01) | |
| *G06F 16/248* | (2019.01) | |
| *G06F 30/20* | (2020.01) | |
| *G06F 40/166* | (2020.01) | |
| *G06F 40/117* | (2020.01) | |
| *G06F 40/20* | (2020.01) | |
| *G06F 8/71* | (2018.01) | |
| *G06F 17/18* | (2006.01) | |
| *G06F 21/55* | (2013.01) | |
| *G06F 21/60* | (2013.01) | |
| *G06K 9/62* | (2022.01) | |
| *G06N 7/00* | (2006.01) | |
| *G06Q 10/04* | (2012.01) | |
| *G06T 11/00* | (2006.01) | |
| *H04L 9/40* | (2022.01) | |
| *H04L 67/306* | (2022.01) | |
| *H04L 67/00* | (2022.01) | |
| *H04N 21/234* | (2011.01) | |
| *H04N 21/81* | (2011.01) | |
| *G06N 5/00* | (2006.01) | |
| *G06N 5/02* | (2006.01) | |
| *G06V 10/70* | (2022.01) | |
| *G06V 10/98* | (2022.01) | |
| *G06V 30/194* | (2022.01) | |
| *G06V 30/196* | (2022.01) | |

(52) U.S. Cl.
 CPC ...... *G06F 11/3608* (2013.01); *G06F 11/3628* (2013.01); *G06F 11/3636* (2013.01); *G06F 16/2237* (2019.01); *G06F 16/2264* (2019.01); *G06F 16/248* (2019.01); *G06F 16/2423* (2019.01); *G06F 16/24568* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/906* (2019.01); *G06F 16/9038* (2019.01); *G06F 16/90332* (2019.01); *G06F 16/90335* (2019.01); *G06F 16/93* (2019.01); *G06F 17/15* (2013.01); *G06F 17/16* (2013.01); *G06F 17/18* (2013.01); *G06F 21/552* (2013.01); *G06F 21/60* (2013.01); *G06F 21/6245* (2013.01); *G06F 21/6254* (2013.01); *G06F 30/20* (2020.01); *G06F 40/117* (2020.01); *G06F 40/166* (2020.01); *G06F 40/20* (2020.01); *G06K 9/6215* (2013.01); *G06K 9/6218* (2013.01); *G06K 9/6231* (2013.01); *G06K 9/6232* (2013.01); *G06K 9/6253* (2013.01); *G06K 9/6256* (2013.01); *G06K 9/6257* (2013.01); *G06K 9/6262* (2013.01); *G06K 9/6265* (2013.01); *G06K 9/6267* (2013.01); *G06K 9/6269* (2013.01); *G06K 9/6277* (2013.01); *G06N 3/04* (2013.01); *G06N 3/0445* (2013.01); *G06N 3/0454* (2013.01); *G06N 3/08* (2013.01); *G06N 3/088* (2013.01); *G06N 5/00* (2013.01); *G06N 5/02* (2013.01); *G06N 5/04* (2013.01); *G06N 7/00* (2013.01); *G06N 7/005* (2013.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *G06V 10/768* (2022.01); *G06V 10/993* (2022.01); *G06V 30/194* (2022.01); *G06V 30/1985* (2022.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01)

(56) References Cited

U.S. PATENT DOCUMENTS

| | | | |
|---|---|---|---|
| 6,137,912 | A | 10/2000 | Kostrzewski et al. |
| 6,269,351 | B1 | 7/2001 | Black |
| 6,456,990 | B1 | 9/2002 | Hofmann et al. |
| 7,788,191 | B2 | 8/2010 | Jebara |
| 7,953,682 | B2 | 5/2011 | Smith et al. |
| 8,375,014 | B1 | 2/2013 | Brocato et al. |
| 8,375,032 | B2 | 2/2013 | Birdwell et al. |
| 8,392,418 | B2 | 3/2013 | Birdwell et al. |
| 8,484,215 | B2 | 7/2013 | Anderson |
| 8,548,951 | B2 | 10/2013 | Solmer et al. |
| 8,706,659 | B1 | 4/2014 | Mann et al. |
| 8,782,744 | B1 | 7/2014 | Fuller et al. |
| 8,990,236 | B2 | 3/2015 | Mizrahy et al. |
| 9,171,146 | B2 | 10/2015 | Vipat et al. |
| 9,274,935 | B1 | 3/2016 | Lachwani et al. |
| 9,462,013 | B1 | 10/2016 | Boss et al. |
| 9,497,202 | B1 * | 11/2016 | Calo ............... G06F 16/5838 |
| 9,608,809 | B1 * | 3/2017 | Ghetti .................. H04L 9/083 |
| 9,678,999 | B1 | 6/2017 | Gibas et al. |
| 9,716,842 | B1 | 7/2017 | Worley et al. |
| 9,754,190 | B1 | 9/2017 | Guttmann |
| 9,886,247 | B2 | 2/2018 | Laredo et al. |
| 9,912,698 | B1 | 3/2018 | Thioux et al. |
| 9,954,893 | B1 | 4/2018 | Zhao et al. |
| 10,122,969 | B1 | 11/2018 | Lim et al. |
| 10,212,428 | B2 | 2/2019 | Trepte |
| 10,235,533 | B1 * | 3/2019 | Thoren ................ G06F 16/252 |
| 10,282,907 | B2 | 5/2019 | Miller et al. |
| 10,453,220 | B1 | 10/2019 | Mihal et al. |
| 2002/0103793 | A1 | 8/2002 | Koller et al. |
| 2003/0003861 | A1 | 1/2003 | Kagemoto et al. |
| 2003/0074368 | A1 | 4/2003 | Schuetze et al. |
| 2006/0031622 | A1 | 2/2006 | Jardine |
| 2007/0169017 | A1 | 7/2007 | Coward |
| 2007/0271287 | A1 | 11/2007 | Acharya et al. |
| 2008/0168339 | A1 | 7/2008 | Hudson et al. |
| 2008/0270363 | A1 | 10/2008 | Hunt et al. |
| 2008/0288889 | A1 | 11/2008 | Hunt et al. |
| 2009/0018996 | A1 | 1/2009 | Hunt et al. |
| 2009/0055331 | A1 | 2/2009 | Stewart |
| 2009/0055477 | A1 | 2/2009 | Flesher et al. |
| 2009/0110070 | A1 | 4/2009 | Takahashi et al. |
| 2009/0254971 | A1 | 10/2009 | Herz et al. |
| 2010/0251340 | A1 | 9/2010 | Martin et al. |
| 2010/0254627 | A1 | 10/2010 | Panahpour Tehrani et al. |
| 2010/0332210 | A1 | 12/2010 | Birdwell et al. |

(56) References Cited

U.S. PATENT DOCUMENTS

| | | |
|---|---|---|
| 2010/0332474 A1 | 12/2010 | Birdwell et al. |
| 2012/0174224 A1 | 7/2012 | Thomas et al. |
| 2012/0284213 A1 | 11/2012 | Lin et al. |
| 2013/0117830 A1 | 5/2013 | Erickson et al. |
| 2013/0124526 A1 | 5/2013 | Birdwell |
| 2013/0159309 A1 | 6/2013 | Birdwell et al. |
| 2013/0159310 A1 | 6/2013 | Birdwell et al. |
| 2013/0167192 A1* | 6/2013 | Hickman ............ G06F 21/6245 726/1 |
| 2013/0185811 A1* | 7/2013 | Suchter ............ G06F 21/6218 726/29 |
| 2014/0053061 A1* | 2/2014 | Chasen ............ G06F 17/2247 715/234 |
| 2014/0195466 A1 | 7/2014 | Phillipps et al. |
| 2014/0201126 A1 | 7/2014 | Zadeh et al. |
| 2014/0278339 A1 | 9/2014 | Aliferis et al. |
| 2014/0324760 A1 | 10/2014 | Marwah et al. |
| 2014/0325662 A1 | 10/2014 | Foster et al. |
| 2014/0365549 A1 | 12/2014 | Jenkins |
| 2015/0032761 A1 | 1/2015 | Pasternack |
| 2015/0058388 A1 | 2/2015 | Smigelski |
| 2015/0066793 A1 | 3/2015 | Brown |
| 2015/0100537 A1* | 4/2015 | Grieves ............ G06N 5/048 706/52 |
| 2015/0142764 A1* | 5/2015 | Burgmeier ............ G06F 16/93 707/694 |
| 2015/0220734 A1 | 8/2015 | Nalluri et al. |
| 2015/0241873 A1 | 8/2015 | Goldenberg et al. |
| 2015/0309987 A1* | 10/2015 | Epstein ............ G06F 17/2765 704/9 |
| 2016/0019271 A1 | 1/2016 | Ma et al. |
| 2016/0057107 A1 | 2/2016 | Call et al. |
| 2016/0092476 A1 | 3/2016 | Stojanovic et al. |
| 2016/0092557 A1 | 3/2016 | Stojanovic et al. |
| 2016/0110657 A1 | 4/2016 | Gibiansky et al. |
| 2016/0119377 A1 | 4/2016 | Goldberg et al. |
| 2016/0132787 A1 | 5/2016 | Drevo et al. |
| 2016/0162688 A1 | 6/2016 | Call et al. |
| 2016/0197803 A1 | 7/2016 | Talbot et al. |
| 2016/0219033 A1* | 7/2016 | Hintermeister ..... H04L 63/0853 |
| 2016/0308900 A1 | 10/2016 | Sadika et al. |
| 2016/0371601 A1 | 12/2016 | Grove et al. |
| 2017/0011105 A1 | 1/2017 | Shet et al. |
| 2017/0083990 A1 | 3/2017 | Hou et al. |
| 2017/0147930 A1 | 5/2017 | Bellala et al. |
| 2017/0220336 A1 | 8/2017 | Chen et al. |
| 2017/0236183 A1 | 8/2017 | Klein et al. |
| 2017/0249432 A1 | 8/2017 | Grantcharov |
| 2017/0331858 A1 | 11/2017 | Clark, III et al. |
| 2017/0359570 A1 | 12/2017 | Holzer et al. |
| 2018/0018590 A1 | 1/2018 | Szeto et al. |
| 2018/0108149 A1 | 4/2018 | Levinshtein |
| 2018/0115706 A1 | 4/2018 | Kang et al. |
| 2018/0150548 A1 | 5/2018 | Shah et al. |
| 2018/0165475 A1 | 6/2018 | Veeramachaneni et al. |
| 2018/0165728 A1 | 6/2018 | McDonald et al. |
| 2018/0173730 A1 | 6/2018 | Copenhaver et al. |
| 2018/0173958 A1 | 6/2018 | Hu et al. |
| 2018/0181802 A1 | 6/2018 | Chen et al. |
| 2018/0198602 A1* | 7/2018 | Duffy ............ H04L 9/008 |
| 2018/0199066 A1 | 7/2018 | Ross |
| 2018/0204111 A1 | 7/2018 | Zadeh et al. |
| 2018/0240041 A1 | 8/2018 | Koch et al. |
| 2018/0248827 A1 | 8/2018 | Scharber et al. |
| 2018/0253894 A1 | 9/2018 | Krishan et al. |
| 2018/0260474 A1* | 9/2018 | Surdeanu ............ G06F 17/271 |
| 2018/0260704 A1 | 9/2018 | Sun et al. |
| 2018/0268286 A1 | 9/2018 | Dasgupta |
| 2018/0307978 A1 | 10/2018 | Ar et al. |
| 2018/0336463 A1 | 11/2018 | Bloom |
| 2018/0367484 A1 | 12/2018 | Rodriguez et al. |
| 2019/0005657 A1 | 1/2019 | Gao et al. |
| 2019/0026956 A1 | 1/2019 | Gausebeck et al. |
| 2019/0034833 A1 | 1/2019 | Ding et al. |
| 2019/0042290 A1 | 2/2019 | Bailey et al. |
| 2019/0051051 A1 | 2/2019 | Kaufman et al. |
| 2019/0057509 A1 | 2/2019 | Lv et al. |
| 2019/0079923 A1* | 3/2019 | Hagiwara ............ G06F 40/30 |
| 2019/0147371 A1 | 5/2019 | Deo et al. |
| 2019/0196600 A1 | 6/2019 | Rothberg et al. |
| 2019/0220653 A1 | 7/2019 | Wang et al. |

OTHER PUBLICATIONS

Brkic et al., I Know That Person: Generative Full Body and Face De-Identification of People in Images, 2017 IEEE Conference on Computer Vision and Pattern Recognition Workshops, pp. 1319-1328 (Year: 2017).

C. Willems, T. Holz and F. Freiling, "Toward Automated Dynamic Malware Analysis Using CWSandbox," in IEEE Security & Privacy, vol. 5, No. 2, pp. 32-39, Mar.-Apr. 2007. (Year: 2007).

Dernoncourt, F., Lee, J. Y., Uzuner, O., & Szolovits, P. (2017). De-identification of patient notes with recurrent neural networks. Journal of the American Medical Informatics Association, 24(3), 596-606. (Year: 2017).

Domadia, S. G., & Zaveri, T. (May 2011). Comparative analysis of unsupervised and supervised image classification techniques. In Proceeding of National Conference on Recent Trends in Engineering & Technology (pp. 1-5). (Year: 2011).

Escovedo, Tatiana, et al. "DetectA: abrupt concept drift detection in non-stationary environments." Applied Soft Computing 62 (2017): 119-133. (Year: 2017).

Gidaris, S., & Komodakis, N. (2017). Detect, replace, refine: Deep structured prediction for pixel wise labeling. In Proceedings of the IEEE Conference on Computer Vision and Pattern Recognition (pp. 5248-5257). (Year: 2017).

Hasegawa et al. Interoperability for Mobile Agents by Incarnation Agents. AAMAS'03 Jul. 14-18, 2003, Melbourne, Australia. (Year: 2003).

Jiang, Z., Zhao, C., He, B., Guan, Y., & Jiang, J. (2017). De-identification of medical records using conditional random fields and long short-term memory networks. Journal of biomedical informatics, 75, S43-S53. (Year: 2017).

Kim, Yoon. "Convolutional neural networks for sentence classification." arXiv preprint arXiv: 1408. 5882 (2014). (Year: 2014).

Laszlo, M., & Mukherjee, S. (2013). Optimal univariate microaggregation with data suppression. Journal of Systems and Software, 86(3), 677-682. (Year: 2013).

Malekzadeh et al., Replacement Auto Encoder: A Privacy-Preserving Algorithm for Sensory Data Analysis, 2018 IEEE/ACM Third International Conference on Internet-of-Things Design and Implementation, pp. 166-176 (Year: 2018).

Marc Aurelio Ranzato, Arthur Szlam, Joan Bruna, Michael Mathieu, Ronan Collobert, and Sumit Chopra, "Video (Language) Modeling: A Baseline for Generative Models of Natural Videos", Article, May 4, 2016, 15 pages, Courant Institute of Mathematical Sciences.

Matthias Feurer, Jost Tobias Springenberg, Aaron Klein, Manuel Blum, Katharina Eggensperger, and Frank Hutter, "Efficient and Robust Automated Machine Learning", Advances in Neural Information Processing Systems 28 (Dec. 2015) http://papers.nips.cc/pa.

Park et al., Data Synthesis based on Generative Adversarial Networks, Aug. 2018, Proceedings of the VLDB Endowment, vol. 11, No. 10, pp. 1071-1083 (Year: 2018).

Qin Gao, Will Lewis, Chris Quirk, and Mei-Yuh Hwang. 2011. Incremental training and intentional over-fitting of word alignment. In Proceedings of MT Summit XIII. (Year: 2011).

Roberts, Mike. "Serverless Architectures". https://martinfowler.com/articles/serverless.html. May 22, 2018. Accessed Jul. 22, 2019. (Year: 2018).

Vendrick, Carl, Hamed Pirsiavash, and Antonio Torralba. "Generating videos with scene dynamics." Advances in Neural Information Processing Systems. 2016 (Year: 2016).

Wiktionary. "Spin Up". https://en.wiktionary.org/w/index.php?title=spin_up&oldid=49727714. Jun. 15, 2018. Accessed Jul. 19, 2019. (Year: 2018).

(56) References Cited

OTHER PUBLICATIONS

Xue, Tianfan, et al. "Visual dynamics: Probabilistic future frame synthesis via cross convolutional networks." Advances in Neural Information Processing Systems. 2016 (Year: 2016).

* cited by examiner

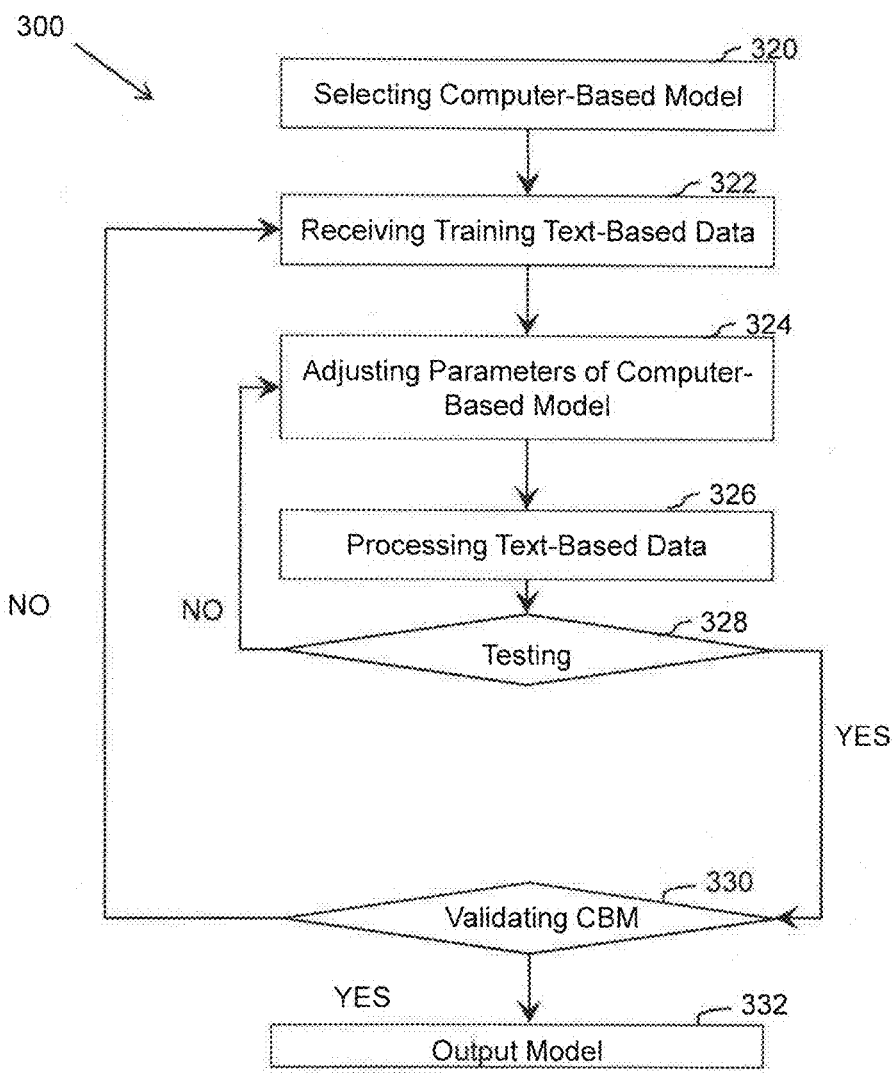

SYSTEMS AND METHODS FOR CENSORING TEXT INLINE

CROSS REFERENCE TO RELATED APPLICATIONS

This application claims the benefit of U.S. Provisional Application No. 62/694,968, filed Jul. 6, 2018, and incorporated herein by reference in its entirety.

This application also relates to U.S. patent application Ser. No. 16/151,407 filed on Oct. 4, 2018, and titled Systems and Methods for Synthetic Data Generation, the disclosure of which is also incorporated herein by reference in its entirety.

TECHNICAL FIELD

The disclosed embodiments generally relate to censoring text, More specifically, the disclosed embodiments relate to censoring text in electronic text-based communications using artificial intelligence.

BACKGROUND

Computers play a large role in document preparation, analysis, and transformation of numerous forms of information, in many instances during communication of text data, there is a need to protect from disclosure text that contains sensitive information, such as security sensitive words, characters or images. For example, private data such as an individual's social security number, credit history, medical history, business trade secrets, and financial data may be restricted from transmitting via a network.

Documents containing text may be evaluated by a computer system for sensitive data prior to communication via a network. The computer system may identify the presence of sensitive data and prevent transmission of the document via a network. This approach may create problems for the users attempting to communicate documents containing text as the inability to deliver the documents may limit the usefulness of the system.

Accordingly, there is a need for a dynamic, fine-grained control on how the documents containing text are censored and communicated between the users.

SUMMARY

Disclosed embodiments provide systems and methods for improved censoring of the text-based data. Disclosed embodiments improve upon disadvantages of conventional censoring by identifying sensitive text characters within the text-based data and censoring only the identified text characters.

Consistent with a disclosed embodiment, a censoring system for censoring text-based data is provided. The system may comprise at least one processor and at least one non-transitory memory storing application programming interface instructions that, when executed by the at least one processor cause the censoring system to perform operations that may include storing a target pattern type. The operations may further include storing a computer-based model for identifying a target data pattern corresponding to a target pattern type within text based data, for identifying target characters within the target data pattern, and for censoring the target characters within the identified target data pattern in the text-based data. The operations may further include receiving text-based data by a server. The operations may further include retrieving the stored target pattern type to be censored in the text-based data. The operations may further include identifying within the received text-based data, a target data pattern corresponding to the retrieved target pattern type using the computer-based model. The operations may further include censoring target characters within the identified target data pattern in the received text-based data with substitute characters, resulting in censored text-based data; and transmitting the censored text-based data to a receiving party.

Consistent with another disclosed embodiment, a method for censoring text-based data is provided. The method may comprise receiving a target pattern type. The method may further comprise storing a computer-based model for identifying a target data pattern corresponding to a target pattern type within text based data, for identifying target characters within the target data pattern, and for censoring the target characters within the identified target data pattern in the text-based data. The method may further comprise receiving text-based data by a server. The method may further comprise retrieving the stored target pattern type to be censored in the text-based data. The method may further comprise identifying within the received text-based data, a target data pattern corresponding to the retrieved target pattern type using the computer-based model.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings are not necessarily to scale or exhaustive. Instead, emphasis is generally placed upon illustrating the principles of the inventions described herein. The drawings, which are incorporated in and constitute a part of this specification, illustrate several embodiments consistent with the disclosure and, together with the detailed description, serve to explain the principles of the disclosure. In the drawings:

FIG. 3A is a flowchart of an illustrative process of training a computer-based model, consistent with disclosed embodiments.

FIG. 3B shows illustrative training text-data with tags, consistent with disclosed embodiments.

DETAILED DESCRIPTION

Figure 1:
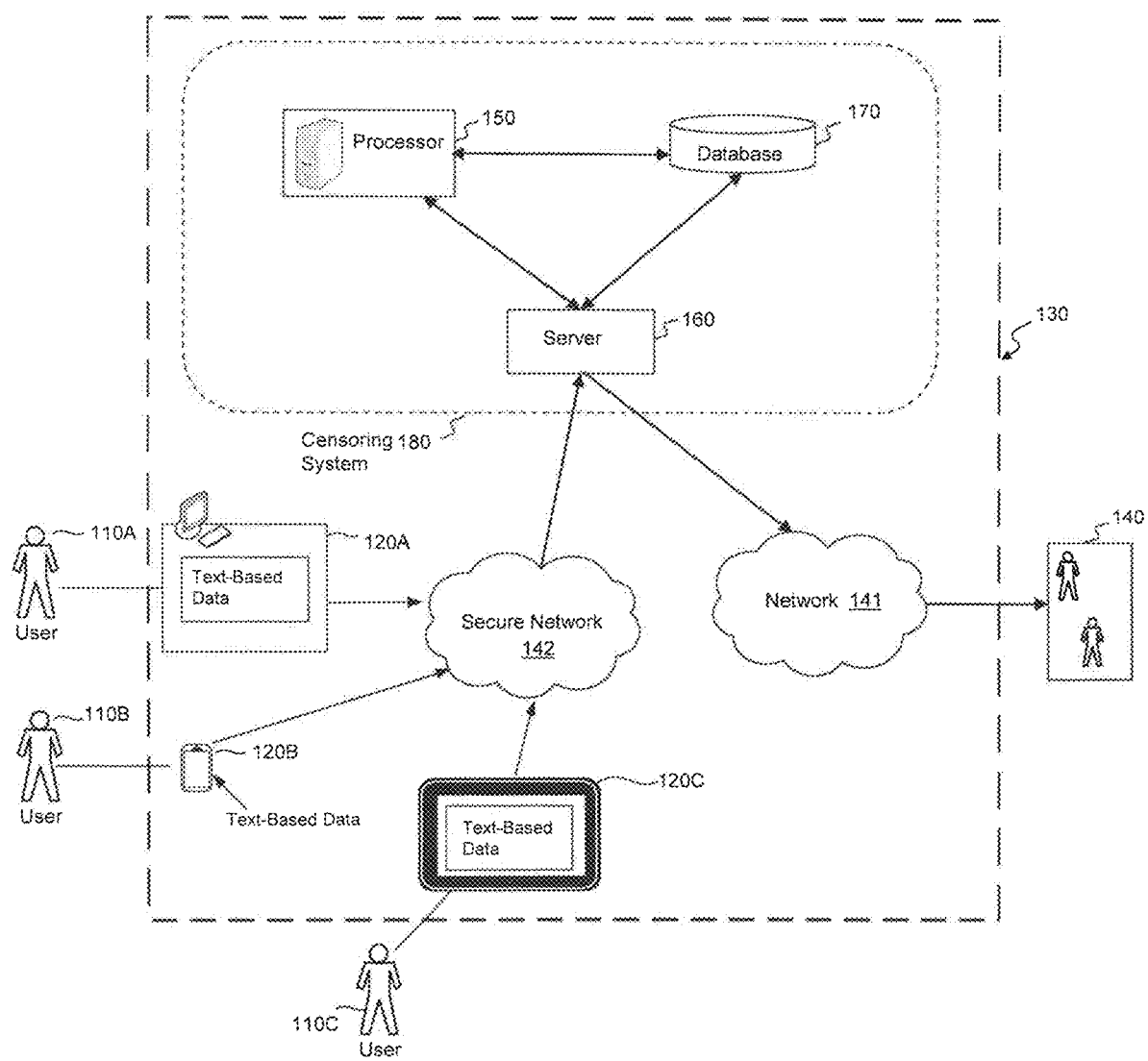
FIG. 1 is a diagram of an illustrative system for communicating and censoring data, consistent with disclosed embodiments.

Reference will now be made in detail to exemplary embodiments, discussed with regard to the accompanying drawings. In some instances, the same reference numbers will be used throughout the drawings and the following description to refer to the same or like parts. Unless otherwise defined, technical and/or scientific terms have the meaning commonly understood by one of ordinary skill in the art. The disclosed embodiments are described in sufficient detail to enable those skilled in the art to practice the disclosed embodiments. It is to be understood that other embodiments may be utilized and that changes may be made without departing from the scope of the disclosed embodiments. Thus the materials, methods, and examples are illustrative only and are not intended to be necessarily limiting.

The disclosed embodiments describe an artificial intelligence system for censoring text-based data. In the present disclosure, the terms "first party" and "second party" may refer to a person or an entity (e.g., a company, a group or an organization). In the present disclosure, the first party may send the censored text-based data containing sensitive information to a second party. In the present disclosure, the term "censoring" may refer to a process of identifying and removing sensitive data, where the sensitive data is associated with a first party that contains information that, when released to a third party, (e.g., a person or an entity that is not authorized to obtain the text-based data) adversely affects the first party. The sensitive data may include Personal Identifiable Data (HD) such as social security number, address, phone number, description of a person, description of objects possessed by a person, as well as person's license and registration numbers. Examples of other sensitive data for a person or an entity may include financial data, criminal records, educational records, voting records, marital status, or any other data that when released to a third party may adversely affect the person or the entity associated with the sensitive data.

In the present disclosure, the term "text-based data" may refer to any data that contains text characters including alphanumeric and special characters. For example, the data may include email letters, office documents, pictures with included text, —art, as well as binary data rendered as text data. Examples of special characters may include quotes, mathematical operators, and formatting characters such as paragraph characters and tab characters. The described examples of special characters are only illustrative, and other special characters may be used. The text-based data may be based on text characters from a variety of languages; for example, the text characters may include Chinese characters, Japanese characters, Cyrillic characters, Greek characters or other text characters. In some embodiments, the text-based data may include data embedded into image data or video data. In some embodiments, the text-based data may be part of the scanned text. For example, the text-based data may be a scanned text image in PDF format.

The artificial intelligence system may include computing resources and software instructions for manipulating text-based data. Computing resources may include one or more computing devices configured to analyze text-based data. The computing devices may include one or more memory units for storing data and software instructions. The data may be stored in a database that may include cloud-based databases (e.g., Amazon Web Services S3 buckets) or on-premises databases. Databases may include, for example, Oracle™ databases, Sybase™ databases, or other relational databases or non-relational databases, such as Hadoop™ sequence files, HBase™, or Cassandra™. Database(s) may include computing components (e.g., database management system, database server, etc.) configured to receive and process requests for data stored in memory devices of the database(s) and to provide data from the database(s). The memory unit may also store software instructions that may perform computing functions and operations when executed by one or more processors, such as one or more operations related to data manipulation and analysis. The disclosed embodiments are not limited to software instructions being separate programs run on isolated computer processors configured to perform dedicated tasks. In some embodiments, software instructions may include many different programs. In some embodiments, one or more computers may include multiple processors operating in parallel. A processor may be a central processing unit (CPU) or a special-purpose computing device, such as graphical processing unit (GPU), a field-programmable gate array (FPGA) or application-specific integrated circuits.

The artificial intelligence system may be configured to receive the text-based data via a secure network by a server. The network may include any combination of electronics communications networks enabling communication between user devices and the components of the artificial intelligence system. For example, the network may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art.

The server may be a computer program or a device that provides functionality for other programs or devices, called "clients". Servers may provide various functionalities, often called "services", such as sharing data or resources among multiple clients, or performing computation for a client. A single server can serve multiple clients. The servers may be a database server. A database server is a server which houses a database application that provides database services to other computer programs or other computers defined as clients. The artificial intelligence system for censoring text-based data may be configured to instruct the server to store the text-based data in a database.

The artificial intelligence system for censoring text-based data may be configured to receive a target pattern type to be censored in the text-based data. The term "target pattern type" may refer to a particular type of sensitive data that requires censorship and may be a string of text identifying the type of the sensitive data. For example, the target pattern type may include a social security number, a name, a mobile telephone, an address, a checking account, a driver's license and/or the like. In various embodiments, the target pattern type may be used as a label to identify the type of sensitive data that an artificial intelligence system needs to censor. As a label, it can be any alphanumerical string. For example, the target pattern type may be "Phone Number", "Phone Numbers" "Telephone1" or any other label that might be associated with the sensitive data pertaining to a phone number.

The artificial intelligence system may be configured to receive a list of various target pattern types that may be associated with various types of sensitive data that can be found in the text-based data. For example, for documents related to the financial information, the sensitive data may include checking and saving accounts, the information about mutual funds, person's address, phone number and salary information as well as other sensitive data, such as for example, the credit history. For documents containing a specific type of data, such as financial data, the system may provide a pre-compiled list of target pattern types. For example, the list may include "Social Security Number", "Checking Account", "Savings Account", "Mutual Funds Account", "Phone", "Street Address", "Salary" or other target pattern types.

The target pattern type may identify a collection of target data patterns associated with sensitive information. For example, the target data pattern that corresponds to a social security number may include the social security number and/or a social security number in addition to one or more additional characters and/or words adjacent to the social security number. As an example, a target data pattern (DP) may include DP1: "SSN #123-456-7891" or DP2: "Soc. Sec. No. 123-456-7891" or DP3: "Social Security Number: 123-456-7891". The described examples are only illustrative, and other target data patterns associated with a social security number may be used. The collection of target data patterns {DP1, DP2, . . . DPN} is identified by the target pattern type. For example, the collection of target patterns {DP1, DP2, . . . DPN} may be identified by a target pattern type being a "Social Security Number".

In various embodiments, different target data patterns may need to be identified. For example, some target data patterns may be related to the phone numbers located in association with an address of a person and may be identified by a target pattern type "Home Phone Number". Other target data patterns may include a checking account number located adjacent to the words "checking account" that may be identified by a target pattern type "Bank Account." The various embodiments discussed above are only illustrative, and other target data patterns and target pattern types may be considered. For example, in the various embodiments, the target data patterns and target pattern types of which a computer-based model may be trained to identify can include any target data pattern and target pattern type that is desired to be identified and/or censored.

The artificial intelligence system may be configured to assemble a computer-based model for identifying a target data pattern corresponding to the received target pattern types. In general, the artificial intelligence system may be configured to assemble a computer-based model for the target pattern type found in the list of target pattern types received by the artificial intelligence system. The computer-based model may include a machine learning model trained to identify sensitive data within text-based data related to a specific target pattern type. For example, the computer-based model may be trained to identify various target data patterns. In addition, the computer-based model may analyze identified target data patterns and detect sensitive information within target data patterns. For example, the target data pattern may be "SSN #123-23-1234", and the sensitive information within such target data pattern may be "123-23-1234".

In various embodiments, machine-learning models may include neural networks, recurrent neural networks, generative adversarial networks, decision trees, and models based on ensemble methods, such as random forests. The machine-learning models may have parameters that may be selected for optimizing the performance of the machine-learning model. For example, parameters specific to the particular type of model (e.g., the number of features and number of layers in a generative adversarial network or recurrent neural network) may be optimized to improve the model's performance.

In various embodiments, the computer-based model may identify target characters within a target data pattern. For example, the system may first identify a target data pattern, such as "SSN #123-456-7891", Within this target data pattern, the system may identify target characters "123-456-7891" that need to be censored. In various embodiments, the identified target characters may be censored by removing or obscuring the character strings or by replacing them with generic text that does not contain sensitive information. For example, the system may replace target characters with characters "Social Security Number1". In various embodiments of the present disclosure, censoring a target pattern type may imply censoring target characters within target data patterns associated with the target pattern type. Also, in various embodiments, censoring a target data pattern may imply censoring target characters within the target data pattern.

In various embodiments, the artificial intelligence system may be configured to assign an identification token to the target characters corresponding to the identified target data pattern. For example, the target data pattern may be "SSN

123-456-7891", the corresponding target characters "123-456-7891" and the identification token for the target characters may be "SSN1". The identification token may be used to quickly locate the target characters within the text-based data and perform operations on the target characters. In an embodiment, target characters may be replaced with a text substitute string, for example, depending on security characteristics. The term "text substitute string" may refer to text characters that may replace the target characters.

The term "security characteristics" may refer to various permission levels related to selecting various text substitute strings. In an example embodiment, the simple permission level (PL) may include a PL1 allowing the receiving party that is granted PL1 for the identification token, such as, for example, the token "SSN1" to view the target characters 123-456-7891 within the text-based data. In some cases, the receiving party may be granted a PL2 for the identification token, that is different from PL1. In such cases, the receiving party may not see the target characters, but instead may be authorized to see a first text substitute string which may be, for example, "last four of ssn: 7891", As another example, the receiving party may be granted a PL3 for the identification token, that is different from PL1 For such case, the receiving party may be authorized to see "NA" in place of the target characters 123-456-7891. In various embodiments, the identification token may correspond to one or more security characteristics.

In some embodiments, the receiving party may not have permissions to receive personal contact information (PCI), personable identifiable information (PII) or non-public information (NPI) within text-based data. PCI may include, for example, address, email and phone number of a person or an entity. PII is may be regarded in the information security and privacy fields as any piece of information which can potentially be used to uniquely identify, contact, or locate a person or an entity. PII may include national identification numbers, street addresses, driver's licenses, telephone numbers, IP addresses, email addresses, vehicle registrations, and ages. In general, PII may be broader in scope than PCI. NPI may include names, addresses, telephone numbers, social security numbers, PINS, passwords, account numbers, salaries, medical information, and account balances of a person or an entity. In general, NPI may be broader than personally identifiable information (PII).

In various embodiments, the receiving party may have a permission level that does not allow receiving any non-public information contained in the text-based data. For example, the receiving party may have permission level PL3 that allows receiving text-based data containing no NPI. In some embodiments, the receiving party may have a permission level (for example, permission level PL2) that allows receiving party to receive NPI but not PII within text-based data.

In some embodiments, receiving party may have different permission levels associated with different text-based data. For example, for some text-based data the receiving party may have permission level PL1 that allows the receiving party to receive NPI within text-based data, but for another text-based data, the receiving party may have permission level PL3 that does not allow the receiving party to obtain NPI within text-based data. In some embodiments, a user or an entity associated with text-based data may determine what permissions may be granted to the receiving party.

For the pair of the identification token and the security characteristic assigned to the identification token, the method may provide a unique text substitute string that can replace the target characters within the target data pattern of the text-based data. In some embodiments, the text substitute string can replace a portion of the target data pattern, or the entirety of the target data pattern depending on the security characteristics. For example, if a receiving party may be granted a PL5 for the identification token "SSN1", the entire target data pattern "SSN #123-457891" may be replaced with the text substitute string "Social Security is not available".

In various embodiments the artificial intelligence system may receive a request for text-based data from a user having a set of security characteristics. For example, the user may have security characteristics such as {PL1 "SSN1" PL3 "Home Phone"; PL1 "Name", PL1 "Office Number", PL10 "Crime Record"}, where PL1, PL3, and PL10 are security characteristics, and "SSN1", "Home Phone"; "Name", "Office Number", and "Crime Record", may be identification tokens for the related sensitive target characters that may be found in the text-based data. The artificial intelligence system based on user security characteristics, may determine target characters that need to be censored, and may substitute the target characters with the text substitute strings resulting in a censored text-based data.

In various embodiments, the artificial intelligence system may receive one or more target pattern types requiring censorship, receive text-based data, and apply one or more computer-based models corresponding to one or more target pattern types to censor text-based data. The computer-based models may identify, within the received text-based data, a target data pattern corresponding to the received target pattern type and replace the target characters within the identified target data pattern with substitute characters, resulting in censored text-based data. The censored text-based data may then be transmitted via a network or stored in a computer memory for further use.

The artificial intelligence system may be configured to receive data that require censorship from user devices via a secure network. Components of an artificial intelligence system 130 are demonstrated in FIG. 1. For example, FIG. 1 shows users 110A-110C interacting with censoring system 180 via user devices 120A-120C. The user devices may include laptop or desktop computer schematically represented by 120A, a mobile phone such as smart phone schematically represented by 120B, or a tablet represented by 120C. The various examples of user devices are only illustrative, and other devices may be used by the users to interact with the censoring system 180. The devices may be configured to communicate with censoring system 180 via a secure network 142 and be allowed to transmit text-based data containing sensitive information via secure network 142. Text-based data transmitted via secure network 142 may include mails, office documents, text documents, information transmitted from the interactive forms, and other types of text-based data, in addition, the text-based data may include images, audio and video files associated with the text-based data. For example, the transmitted text-based data may include a PowerPoint presentation that may include both text data and various audio, video and image data. The sensitive information may be encoded to ensure that it is not intercepted or compromised.

The censoring system may include at least one processor 150 a server 160 and a database 170 as shown in FIG. 1. Server 160 may be configured to receive text-based data from secure network 142, store the text-based data in database 170, and transmit the text-based data to processor 150. Processor 150 may be configured to execute software instructions for identifying the sensitive data within text-based data and for censoring the text-based data. The censored text-based data may then be submitted to server 160 and distributed over the network 141 to a receiving party 140. Network 141 may not need to be secure, as since the censored data may not contain sensitive data. In various embodiments, the censored data may undergo further analysis by artificial intelligence system 130 to ensure that it may not contain any sensitive data prior to transmitting it over the network 141. Processor 150 may censor text-based data using computer-bases models (CBMs) trained to identify sensitive data.

Figure 2:
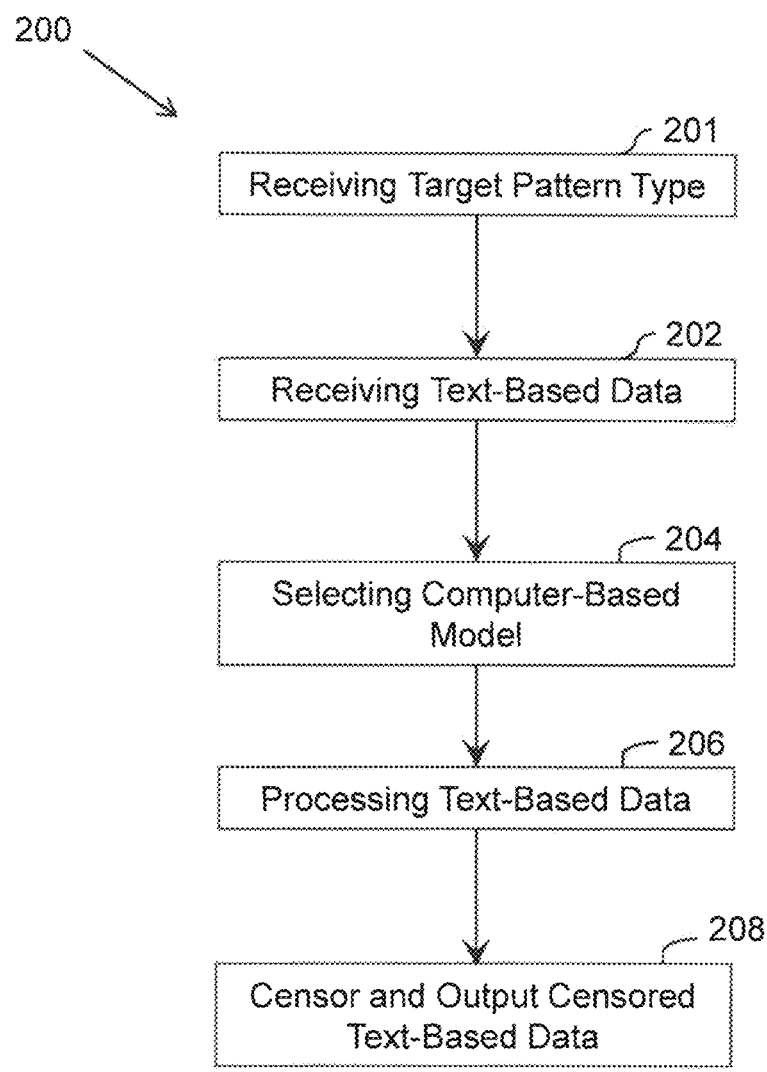
FIG. 2 is a flowchart of an illustrative process of processing text-based data using computer-based model, consistent with disclosed embodiments.

FIG. 2 shows an illustrative process 200 of using a CBM. Process 200 may be performed by, for example, processor 150 of censoring system 180. It is to be understood, however, that one or more steps of process 200 may be implemented by other components of system 130 (shown or not shown), including, for example, one or more of devices 120A, 120B, and 120C.

In step 201, artificial intelligence system 130 may receive, as a first input, a string of text representing target pattern type. In step 202, artificial intelligence system 130 may receive, as a second input, a training text-based data. For example, the first input may be a string "Social Security Number" representing the target pattern type, and the second input may be a text-based financial document containing user related information, such as the user's address and the user's phone number. In step 204, artificial intelligence system 130 may select an appropriate CBM related to the received target pattern type. In step 206, the selected CBM may process the text-based data by identifying the sensitive information that needs to be censored. In step 208, artificial intelligence system 130 may be configured to censor the identified information as a part of the processing step of 208 and output the censored text-based data. For example, the CBM may be configured to remove or obscure (e.g., by blacking out or covering over) sensitive information from the text-based data or substitute target characters related to the sensitive information within the text-based data by some default generic characters. In some embodiments, the censoring process may be executed by a different software application not directly related to the CBM.

Identifying the sensitive information by the CBM in step 206, may include the CBM assigning a probability value to the character in a string of characters forming the text-based data. For example, for target pattern type "Phone" and for text-based data "Jane Doe's permanent address is Branch Ave, apt 234, Alcorn, N.H. 20401, and her phone number: 567-342-1238", the probability value for all the characters in the text-based data except characters "phone number 567-342-1238" may be close to zero. The probability value for the character in the target data pattern "phone number 567-342-1238" may be close to one for probability values obtained from a well-trained CBM. The target data pattern may be identified by selecting the characters within the text-based data that have substantially non-zero probability values, or that have probability values that are close to one. For untrained CBMs, the probability value for various characters within the text-based data may be a random number between zero and one.

After identifying the target data pattern in step 206, the CBM may also identify the target characters that need to be censored. For example, within the text data pattern "phone number 567-342-1238", the target characters that need to be censored may be "567-342-1238". While the CBM may be trained to identify complex target data patterns such as "phone number 567-342-1238" containing both sensitive characters "567-342-1238" the CBM may also identify simpler target data patterns such as "567-342-1238". In some embodiments, the CBM may be configured or trained to identify target data patterns that include only the characters that need to be censored. For example, the target data pattern may correspond to just the social security number "567-342-123" that needs to be censored. In some embodiments, it may be important to identify complex target data patterns. For example, the text-based data may contain the following string "the phone number of the customer is 123-435-1234, and the identification number for his hamster is 567-452-1234". In such case, the CBM may need to only censor the number "123-435-1234" and may not need to censor the number "567-452-1234" related to the identification number for a pet hamster. For example, if the censored data is transmitted to a second party being a veterinarian, it may be essential to preserve the identification number for the hamster uncensored.

In step 206, CBM may censor the target characters by substituting synthetic characters for the characters that need to be censored. The term "synthetic" may refer to data that may resemble sensitive data but does not contain real sensitive information. For example, the synthetic characters for the phone number may be "321-345-2134" or other arrangements of text data that may closely resemble the sensitive data but do not actually correspond to real data. In step 206, CBM may censor the target characters by substituting generic characters for the characters that need to be censored. The term "generic" may refer to non-descriptive text data that may not necessarily resemble sensitive data. For example, the generic characters for the phone number may be "xxx-xxx-xxxx" or other non-descriptive text data. Various embodiments of censoring target characters by substituting synthetic characters are discussed in U.S. patent application Ser. No. 16/151,407 filed Oct. 5, 2018, and incorporated here by reference.

In step 208, the CBM may output the censored text-based data to artificial intelligence system 130. In an illustrative embodiment, artificial intelligence system 130 may store the censored text-based data in the database. Additionally, or alternatively, artificial intelligence system 130 may communicate the censored text-based data via network 141 to a receiving party 140. In some embodiments, artificial intelligence system 130 may communicate text-based data to server 160 via secure network 142. Server 160 may be configured to save the text-based data in a secure database. In some embodiments, server 160 may request processor 150 to censor text-based data and store censored text-based data in in another database, which may be less secure or maintain different security standards. In some embodiments, server 160 may be configured to communicate the censored text-based data via network 141 to the receiving party 140.

In various embodiments, CBMs, such as neural networks, may need to be trained to correctly identify target characters within a target data pattern for a given target pattern type. In general, to train a CBM, artificial intelligence system 130 may provide a set of inputs to the model, determine the output of the model, and adjust parameters of the model to obtain the desired output. FIG. 3A shows an illustrative process 300 of training a CBM. Process 300 may be performed by, for example, processor 150 of censoring system 180. It is to be understood, however, that one or more steps of process 300 may be implemented by other components of system 130 (shown or not shown), including, for example, one or more of devices 120A, 120B, and 120C. Various embodiments of training CBMs are discussed in U.S. patent application Ser. No. 16/151,407 filed Oct. 5, 2018, and incorporated here by reference.

In some embodiments, the training may start with step 320 of selecting a CBM. For example, if a neural network is selected as a CBM, then various parameters of the neural network may be selected during step 320. For instance, the number of hidden layers and the number of nodes may be selected during step 320. In step 322 the CBM may receive a training text-based data. FIG. 3B, shows a table comprising training text-based data and tags identifying target characters that need to be censored. For example, the training text-based data may include target characters 350 that may have associated numerical or alphabetical tags 352 indicating if the data requires censoring. For example, the numerical tag zero may indicate that the character does not need to be censored, and the tag one may indicate that the character needs to be censored. In step 324 the parameters of CBM may be adjusted. The parameters may be adjusted after at least one iteration via the training process. Furthermore, the parameters may be adjusted by the training process via backpropagation process for cases when CBM is an artificial neural network. In some embodiments, step 324 may involve a training specialist (e.g., computer specialists supervising the training of the CBMs) interacting with CBM directly to adjust various GEM parameters.

In various embodiments, artificial intelligence system 130 may parse text-based data using a language parser resulting in identified data objects. The language parser may label data objects of the text-based data with labels or tags, including tags identifying parts of speech. The part of speech tags may include: "noun", "verb", "adjective", "adverb", "pronoun", "preposition", "conjunction", or "interjection". Such preprocessing may be useful for improving the training and performance of CBMs. For example, the labels identifying parts of speech for the text-based data objects may be used as input values to a CBM during and after training.

In various embodiments, the text-based data may include special or predetermined characters. Such characters may include formatting characters such as space characters, tab characters, paragraph characters, as well as semiotic characters such as commas, periods, semicolons, and/or the like. The special characters may be used to preprocess the text-based data into segments, with language parser configured to identify and label the segments. For example, the language parser may be configured to identify and label the sentences within the text-based data.

In some embodiments, non-textural objects or text-based data properties may be identified by a language parser, or example, the language parser may identify the font properties of the text-based data objects. In some embodiments, the language parser may identify mathematical formulas or tables within the text-based data. The text-based data may then be labeled by the language parser as it relates to the non-textural objects or text-based data properties. For example, if the word "Jennifer" appears to be in red font, the language parser may label text characters corresponding to the word "Jennifer" by an appropriate tag, such as "red font" tag. Similarly, as an example, if the word "Jennifer" appears in a table, the language parser may label the text characters corresponding to the word "Jennifer" by an appropriate tag, such as "in table" tag. Other tags may include other supplementary information associated with the text characters. For example, the tags may include "end of the sentence", "capital letter", "in quotes", "next to colon" "in parentheses", "heading", "within address" and/or the like.

In step 326 the CBM may process the text-based data by identifying sensitive information that needs to be censored. The CBM may, in some cases, be configured to censor the identified information as a part of the processing step of 326. For example, the CBM may be configured to remove sensitive information from the text-based data or substitute target characters related to the sensitive information within the text-based data by some default generic characters. In some embodiments, the censoring process may be executed by a different software application not directly related to the CBM. In various embodiments, the process of identifying whether the target characters in the text-based data need to be censored may involve tagging the characters as shown in FIG. 3B with tags 352.

In step 328 artificial intelligence system 130 may evaluate the performance of the CBM by comparing the resulting censored text-based data with the target result. For example, the target censored text-based data may be produced by a training specialist or a separate trained CBM that can identify and censor correctly the text-based data. In FIG. 3B the tag values 352 may be input by a training specialist or a separate trained CBM. If the output of the CBM does not match the target censored text-based data, that is if the tags output by CBM in training do not match the tags of the training text-based data, (step 328; NO) process 300 may proceed to step 324 and the parameters of CBM may be adjusted as described above. The training may then proceed again via steps 326 and 328.

If at step 328 the output of the CBM matches the target censored text-based data (step 328; YES), the process of training may proceed to step 330 of validating CBM. At step 330, the CBM may be further evaluated by censoring various text-based validation data and comparing the censored text-based data to the target censored text-based data. If the CBM satisfactory censors the text-based validation data (step 330; YES), the model may be determined to be trained and may be output in step 332 to artificial intelligence system 130. The model may be then stored in a memory of artificial intelligence system 130. In the case that the CBM fails validation step 330 (step 330; NO) and does not correctly censor the text-based validation data, the training process may be repeated by returning to step 322. If the training fails after a set number of training iterations, artificial intelligence system 130 may inform a training specialist about the failure and discard the CBM.

Figure 3C:
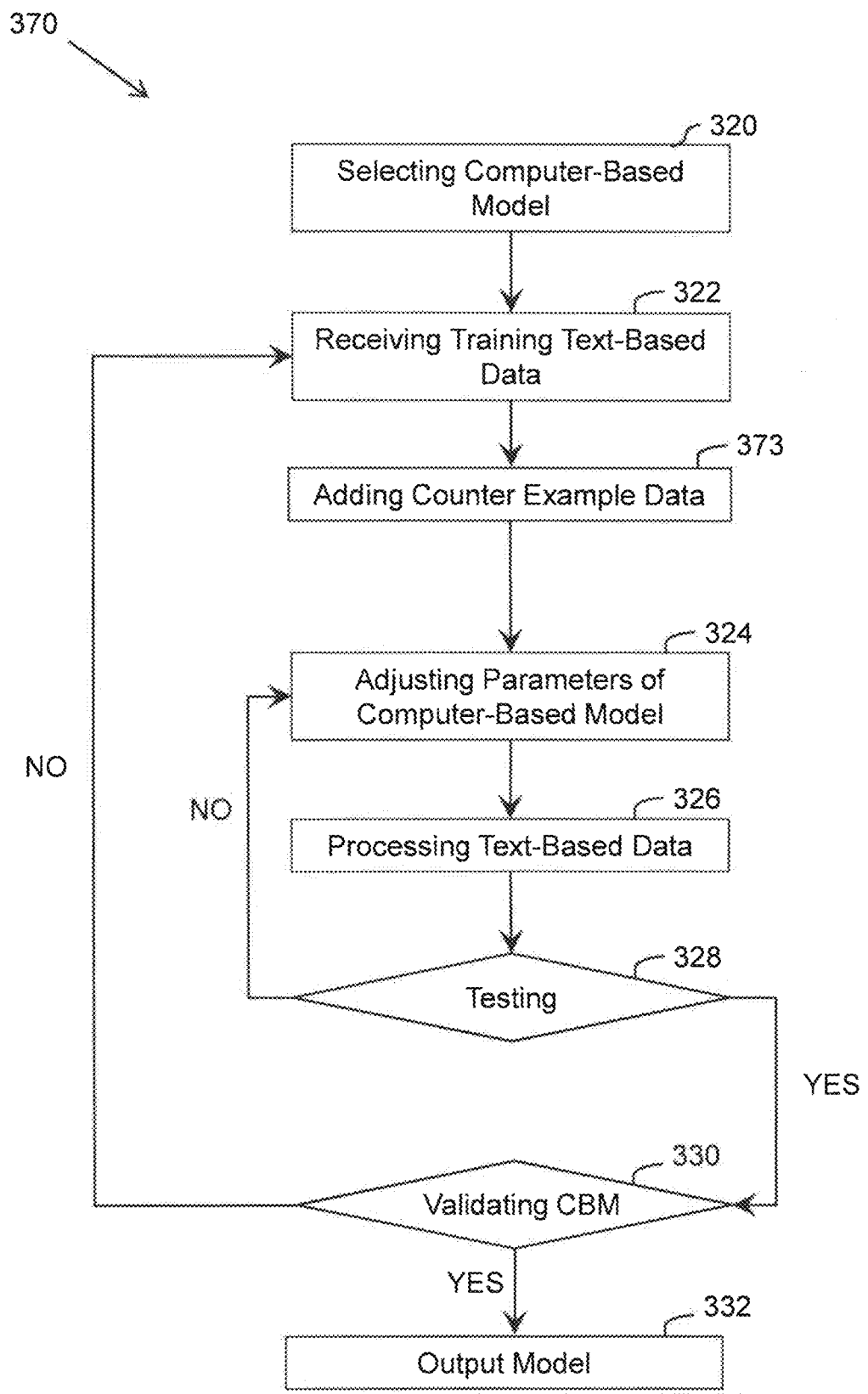
FIG. 3C is a flowchart of an illustrative process of training a computer-based model with the step of adding counter example data, consistent with disclosed embodiments.

FIG. 3C shows a process 370, a variation of process 300 described in FIG. 3A. Wherein the process provides counter examples of data patterns within text-based data. The text-based data may include context data and target data patterns embedded in the context data. The term "context data" may refer to text characters that do not belong to any target data patterns. For example, "Jennifer has a new phone, and her number is 456-123-2.344" may include context data "Jennifer has a new", "and her", with target data pattern being "phone". "number is 456-123-2344". In various embodiments, the target data pattern may have several disjoint parts. For example, the first part of the target data pattern may be "phone", and the second part of the target data pattern may be "number is 456-123-2344". Similarly, the context data may have several disjoint parts such as first part "Jennifer has a new", and a second part "and her".

The text-based data may include context data, the target characters being embedded in the context data, and counter character examples of the target characters embedded in the context data located in proximity to the target characters. The term "counter character examples" or "counter examples" may refer to data patterns that are similar to the target data patterns but do not contain sensitive information related to the information found in the target data patterns. For example, the text-based data may contain the target data pattern "SSN #234-12-1234" and a counter example data pattern "SSN #234-A1-12f4" that does not correspond to a data pattern having a social security number. Another counter example data pattern may include a credit card number adjacent to a social security number. In an example embodiment, the credit card number may be positioned before the social security number, and in another example, the credit card number may be positioned after the social security number. In an example embodiment, the credit card number may be separated from the social security number by some text characters. In another example embodiment, the credit card number may be separated from the social security number by one or more words. In general counter examples of data patterns may be selected to improve CBM via training, by attempting to confuse CBM.

Step 320 of process 370 may be carried out as described in relation to process 300 above. FIG. 3C shows the step 322 of receiving the training text-based data. Step 322 of process 370 may be similar to step 322 of process 300. At step 322 process 370 may select a type of training text-based data to receive. For example, different training text-based data may differ in complexity, type of data, as well as other text metrics. For example, one of the text metrics may include frequency of sensitive data within the text-based data. At step 373 process 370 may add counter example data to the training text-based data received in step 322. The counter example data may be embedded into the text-based data. In general, the counter example data may include counter character examples of target characters embedded in the context data located in proximity to the target characters. Process 370 may proceed with steps 324, 326, 328, 330, and 332 as in process 300. The type of the training text-based data may be selected based on a performance of CBM, For example, if CBM can successfully censor a first type of the training text-based data, as verified, for example, using validating CBM step 330, CBM may be validated in step 330 using a second type of the training text-based data. If CBM fails step 330 (step 330; NO), the training process may be repeated by returning to step 322, where the second type of the training text-based data may be retrieved for training CBM.

Figure 4A:
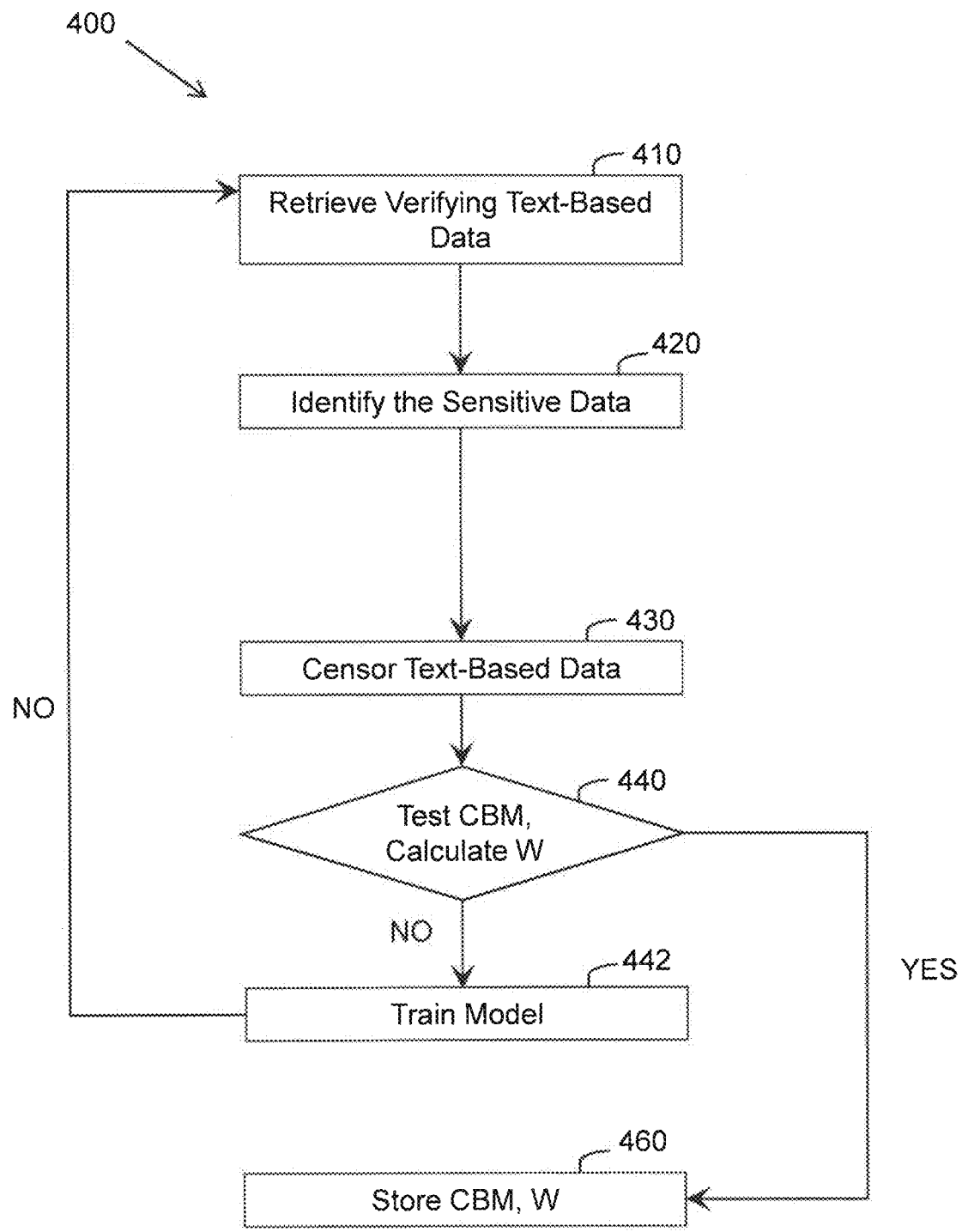
FIG. 4A is a flowchart of an illustrative process of model verification with a step of outputting model accuracy measure, consistent with disclosed embodiments.

FIG. 4A shows an illustrative process 400 of verification of a CBM such that the model is verified and assigned an output accuracy measure W. Process 400 may be performed by, for example, processor 150 of censoring system 180. It is to be understood, however, that one or more steps of process 400 may be implemented by other components of system 130 (shown or not shown), including, for example, one or more of devices 120A, 120B, and 120C.

In step 410 the model may receive the verification text-based data from a database, similar to step 322 of process 370 shown in FIG. 3C. In step 420, the CBM may identify the target data patterns containing the sensitive data. Step 420 may be carried out in a manner similar to the identifying of step 326 of process 300, shown in FIG. 3A. In step 430, the CBM may censor the sensitive data within the target data patterns by substituting target characters corresponding to sensitive data with generic characters. The step 430 may be similar to the censoring of step 326 of process 300 shown in FIG. 3A.

Figure 4B:
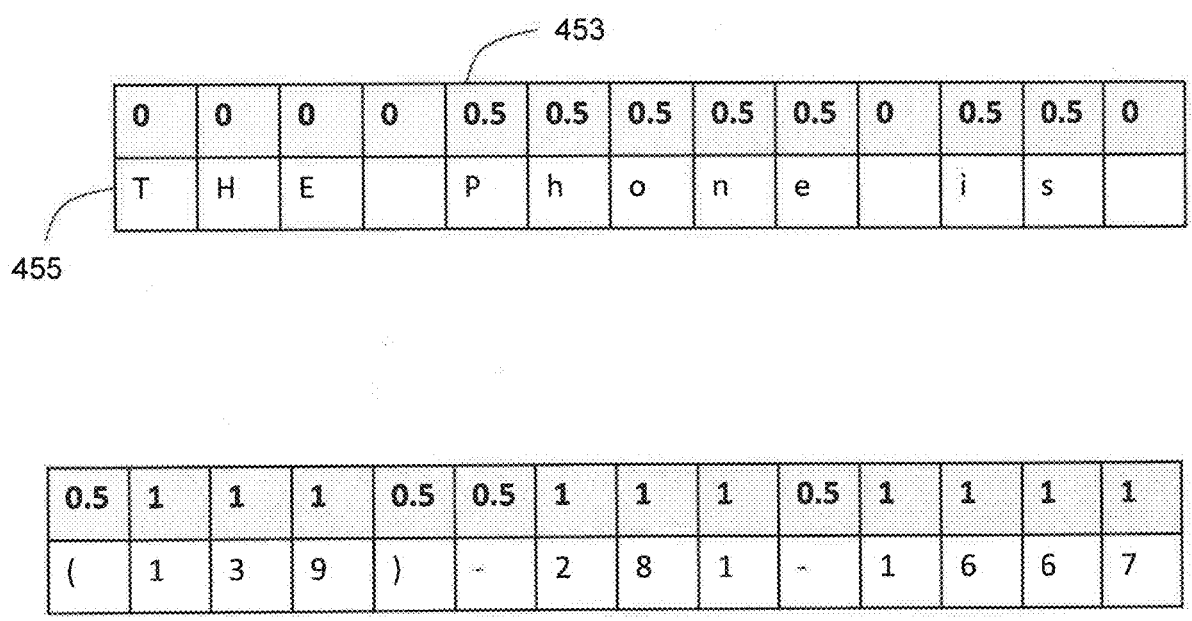
FIG. 4B shows illustrative training text-data with probability values, consistent with disclosed embodiments.

In step 440 the model may measure the accuracy of the censored text-based data. For example, the model may compare the censored text-based data with the target censored text-based data. The model may calculate an output accuracy measure determining the error in the censored text-based data. In step 440, output accuracy measure W may be determined by calculating the measure of an error between probability values generated by CBM (pCBM), indicating if a text character needs to be censored, and target probability values (pT). The target probability value pT may have value 1, for characters that need to be censored, and value 0, for characters that do not need to be censored. For example, FIG. 4B shows illustrative pCBMs 453 for text-based data 455. In an embodiment, the measure of a square of an error may be calculated as (pCBM-pT)(pCBM-pT) for the text character in text-based data 455. The CBM may output pCBM greater than zero, such as, for example, pCBM=0.65 for characters that need to be censored. The CBM may output pCBM close to zero for characters that do not need to be censored. The error for the first character then can be calculated as: (0.65−1)(0.65−1) resulting in square of the error of 0.1225, while the square of the error for the character that does not need to be censored may be for example (0.01−0)(0.01−0), for pCBM=0.01, resulting in the square of the error of 0.0001. The square of the errors for all the characters may be added together to result in a measure for the entire accuracy of the CBM. In some embodiments, the output accuracy measure may be normalized to result in zero for untrained CBMs and one for perfectly trained CBMs. In some embodiments, pCBM may be rounded to zero or to one prior to calculating the output accuracy measure. In such cases, the probability values may be identical to the tag values shown in FIG. 3B. For example, pCBM of 0.65 may be rounded to one and pCBM of 0.001 may be rounded to zero. The square of all the errors may then be computed after rounding the pCBM, The described methods of calculating output accuracy measure is only illustrative, and other approaches may be used. For example, the squares of the errors may be added, and the square root may be calculated from the sum and divided by the number of characters in the text-based data.

Returning to FIG. 4A, if the desired accuracy of the censored text-based data is achieved (step 440; YES), process 400 may proceed to step 460. In step 460 verified CBM and the calculated output accuracy measure W may be stored in database 170 of artificial intelligence system 130. Artificial intelligence system 130 may retrieve CBM from database 170 using target pattern type associated with the retrieved CBM for censoring text-based data containing target pattern type.

If the desired accuracy of the censored text-based data is not achieved (step 440; NO), process 400 may proceed to step 442. In step 442, the CBM may be trained as described, for example, by process 300 shown in FIG. 3A. After completing step 442, process 400 may proceed to step 410 and start a new verification process.

In various embodiments, more than one type of data may need to be censored within text-based data. For example, in an embodiment, both social security and phone numbers may need to be removed from text-based data. In various embodiments, several different CBM may be used to censor the text-based data. For example, the text-based data may be censored by two CBMs. The first CBM may be trained to identify and censor a first target pattern type "Social Security Number", and the second CBM may be trained to identify and censor a second target pattern type "Phone Number" within the text-based data in various embodiments, the first CBM may be used first to censor the first type of the sensitive data, such as social security number, and the second CBM may be used after the first CBM to censor the second type of the sensitive data, such as phone number. In various embodiments, more than two CBMs may be used for censoring multiple types of data within text-based data. In various embodiments, CBMs may only identify the target data patterns but not censor the sensitive target characters. In some embodiments, the CBM may receive instructions on whether to identify or to identify and censor the target data patterns. Additionally, or alternatively, CBMs may only identify the target data patterns and target characters within the target data patterns and provide identifying information to a censoring program (CP). For instance, the identifying information may be a set of tags associated with the character in the text-based data. For instance, FIG. 4B shows the set of tags associated with string "THE Phone is (139)-281-1667" as [0, 0, 0, 0, 0.5, 0.5, 0.5, 0.5, 0.5, 0, 0.5, 0.5, 0, 0.5, 1, 1, 1, 0.5, 0.5, 1, 1, 1, 0.5, 1, 1, 1, 1], where the value of 0 may indicate that the character does not need to be censored and does not belong to a target data pattern, the value of 0.5 might indicate that the character does not need to be censored but belongs to a target data pattern, and the value of 1 may indicate that the character needs to be censored. The identified information in the form of a set of tags for the text character in text-based data may be provided to a CBM that may only censor characters with the tag value of one. For example, the CBM may replace the characters having the tag value of one with some generic data, such as for example, a character "x".

In some embodiments, CBM may extract the sensitive data from the text-based data and store the sensitive data in a secure database for later access. CBM may then censor the text-based data by substituting a token in place of the extracted data. The token may be saved in a database table in association with the record number of the extracted data, such that extracted data may be easily retrieved from the database once the token is provided. In various embodiments artificial intelligence system 130 may be configured to obtain sensitive text-based data, identify the sensitive data, extract sensitive data and communicate the extracted data via secure network 142 to server 160, that may store the extracted data in a database. The artificial intelligence system may relate a token to an extracted data and substitute the token in place of the extracted data. In some embodiments, the token may be linked to a synthetic data that may substitute extracted data. In various embodiments, the artificial intelligent system may include several clients and server 160. The first client may receive the text-based data containing sensitive text and submit it to server 160 via secure network 142. Server 160 may communicate the data to processor 150 for identifying the sensitive data, extracting sensitive data and storing the sensitive data in a database. Server 160 may relate a token to an extracted data and substitute synthetic text in place of the extracted data, while linking the synthetic text to the token. The database and the relation between the token and the extracted data may be encrypted to provide further security.

Artificial intelligence system 130 may permit reconstructing the original text-based data including the sensitive extracted data for requests that have appropriate security characteristics. In some embodiments, the reconstruction may be partial depending on the permission of the request. For example, if the security characteristics for the request allow reconstruction of only data associated with addresses found in the text-based data, only those portions may be reconstructed. The request for data reconstruction may be originated from an authorized user or an entity, such as financial institution, for example. The authorized user may submit the user's authentication data via secure network 14 to server 160 connected to database 170. In addition, the authorized user may submit the censored text-based data having synthetic text in place of extracted data. Server 160 may verify the user's authentication data, identify the sensitive data in the database related to the synthetic text and substitute the sensitive data in place of the synthetic text. In some embodiments, the authentication data may be analyzed and security characteristics to reconstruct text-based data evaluated for that authentication data. For example, for some users with related authentication data, only portions of the text-based data may be allowed to be reconstructed.

Figure 5:
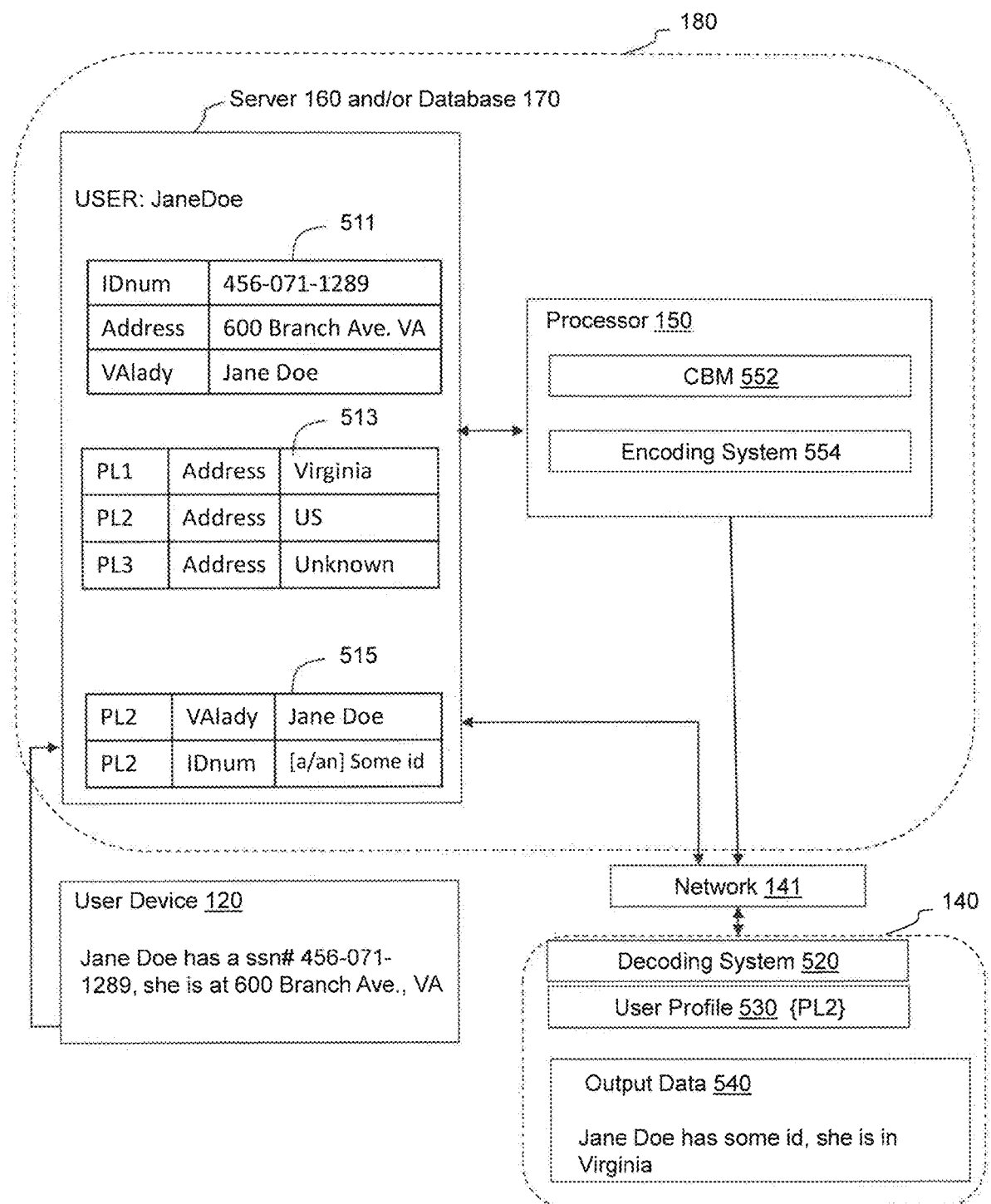
FIG. 5 shows a diagram of an example of a text censoring system, consistent with disclosed embodiments.

FIG. 5 shows an example of reconstructing the data depending on security characteristics of the party receiving the data. FIG. 5 depicts a table 511 associating tokens with sensitive user information. Table 511 may be maintained, for example, in one or more of a server 160 and a database 170 of censoring system 180. For example, the token "IDnum" is associated with a user's social security number "456-071-1289", the token "Address" is associated with the address of the user "600 Branch Ave, VA", and the token VAlady is associated with the name "Jane Doe". FIG. 5 further depicts table 513, which may also be maintained, for example, in one or more of a server 160 and a database 170 of censoring system 180. Table 513 associates at least some of the tokens from table 511 with alternative user information that may either be less sensitive or contain generic data. In some embodiments, the tokens in table 513 may be associated with the original sensitive user's information depending on the security characteristics associated with the receiving party. The associations between the token and the alternative user information in table 513 may be dependent on security characteristics or permission levels. For example, in table 513, PL1 may correspond to a first permission level and PL2 may correspond to a second permission level. For the first permission level PL1, the token "Address" may be identified with the "Virginia"—the information that is less sensitive than "600 Branch Ave, VA" of the original data of table 511. For the second permission level PL2, the token "Address" may be identified with an even less specific address "US", and for the third permission level PL3 the address may be "Unknown".

FIG. 5 further depicts table 515, which may also be maintained, for example, in one or more of a server 160 and a database 170 of censoring system 180. Table 515 may associate at least some other tokens from table 511 with the user information that may correspond to the original information or correspond to less sensitive information. For example, for the permission level PL2 the token VAlady corresponds to the original sensitive information "Jane Doe", and for the same permission level PL2, the token IDnum corresponds to a generic data.

As shown in FIG. 5, censoring system 180 may be configured to receive text-based data from user device 120 and process the text-based data with processor 150, User device 120, shown in FIG. 5, may correspond to any one or more of the user devices 120A-120C shown in FIG. 1. FIG. 5 illustrates an example text-based data "Jane Doe has a ssn #456-071-1289, she is at 600 Branch Ave. VA" that may be communicated by user device 120 to censoring system 180 and may be maintained and/or stored by server 160 and/or database 170, The server 160 and/or database 170 may communicate the text-based data to processor 150, and processor 150 may identify sensitive data using CBM 552.

In an embodiment, processor 150 may communicate the sensitive data to server 160, and the sensitive data may be stored in database 170 in table 511. In some embodiments, sensitive characters in the text-based data may be substituted with tokens using encoding system 554 resulting, for example, in a censored text "VAlady has an IDnum, she is at Address", where the token "VAlady" may substitute name "Jane Doe", the token "IDnum" may substitute social security number "456-071-1289", and the token "Address" may substitute the address "600 Branch Ave, VA". The encoding system 554 may be configured to censor text-based data similar to the use of CBM for censoring text-based data, as described for example, in step 208 of process 200. While the encoding system 554 may be a standalone application as shown in FIG. 5, it may also be part of the CBM as described in step 208 of process 200. The censored text-based data may be communicated via network 141 and delivered to a receiving party device 140 that may include a decoding system 520. Decoding system 520 may be configured to reconstruct a portion of the text-based data containing sensitive information. Decoding system 520 may communicate user profile 530 to server 160 that contains security settings of receiving party 140, i.e., security characteristics or permission levels. For example, receiving party 140 may have permission level PL2 which allows substitution of token "Address" with the value "Virginia". As shown in FIG. 5, permission level PL2 may also allow the receiving party 140 to reconstruct the name of the person within the text-based data, but may not reconstruct the person's social security number. Furthermore, as shown in FIG. 5, the output from the decoding system for receiving party 140 may be "Jane Doe has some id, she is in Virginia". FIG. 5 also shows that table 515 may contain not only characters corresponding to the tokens, such as characters "Jane Doe" corresponding to token VAlady, but also operators that may act on the text-based data when inserted in the text-based data. For example, the string "[a/an] Some id" may remove character "a" or characters "an" from the text-based data prior to inserting string "Some id" into text-based data, if "a" or "an" precedes token that is replaced by string "Some id". For example, in the censored text "VAlady has an IDnum", characters "an" precede IDnum, and are removed when text "Some id" is substituting IDnum.

In various embodiments, artificial intelligence system 130 may be configured to receive text-based data from a user or an entity such as user 110A depicted in FIG. 1, store the text-based data in database 170, receive request from a user or an entity that has an associated profile, such as receiving party 140, and based on the security characteristics found in the profile, censor only data corresponding to target pattern types that require censorship as it relates to the security characteristics found in the profile.

Figure 6:
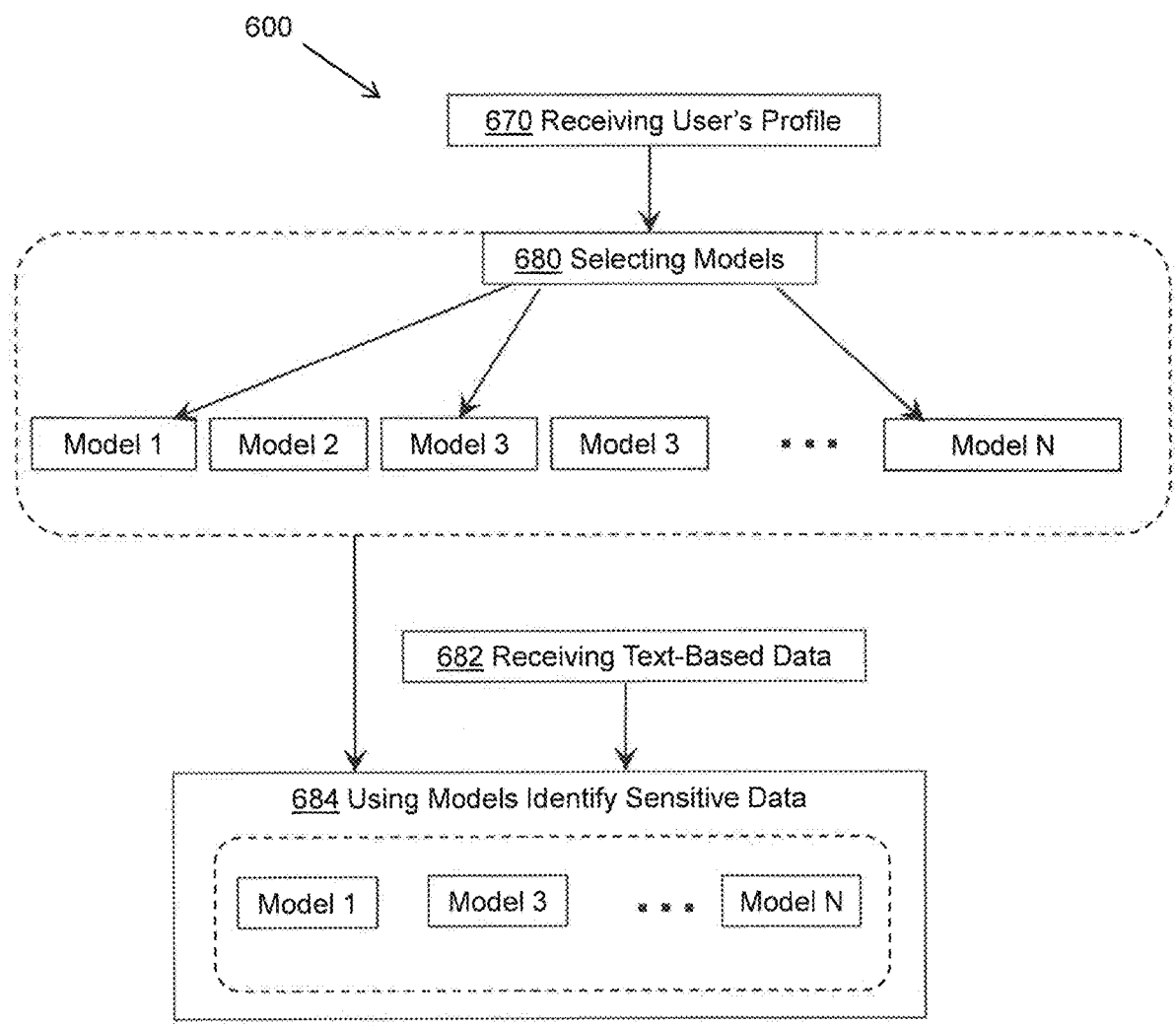
FIG. 6 is a flowchart of an illustrative process of selection of computer models within the text censoring system, consistent with disclosed embodiments.

FIG. 6 shows an illustrative process 600 of censoring text-based data according to security characteristics identified in the user profile of receiving party 140. Process 600 may be performed by, for example, processor 150 of censoring system 180. It is to be understood, however, that one or more steps of process 600 may be implemented by other components of system 130 (shown or not shown), including, for example, one or more of devices 120A, 120B, and 120C.

In step 670, artificial intelligence system 130 may receive a user profile from receiving party 140. The user profile may contain a list of target pattern types and associated permission levels. For example, the user profile may have pairs {PL1 "Social Security Number, PL2 "Address"}, where PL1 and PL2 may be permission levels and "Social Security Number" and "Address" may be target pattern types. Target pattern types that are not included in user profile, and do not have associated permission levels may be censored by artificial intelligence system of 130. In step 680, artificial intelligence system 130 may select a set of models based on the security characteristics found in the user profile. For example, if user profile does not contain permissions to receive social security numbers, artificial intelligence system 130 may be configured to censor sensitive data within text-based data associated with target pattern type related to a social security number. Artificial intelligence system 130 may select CBM in step 680 from available models Model 1 through Model N that correspond to target pattern types that do not have associated permission in the user profile. Using selected CBMs, artificial intelligence system 130 may censor target data patterns found in text-based data. In step 682, artificial intelligence system 130 may be configured to receive text-based data and, using selected models, identify sensitive data in step 684. The steps of receiving text-based data 682 and identifying sensitive data 684 are similar to steps 410 and 420 described in FIG. 4A.

In various embodiments, the process of censoring text-based data may be accomplished using the script that may execute various CBMs depending on text pattern types found in the text-based data. For example, the script may include commands of executing first CBM that may identify addresses presented in the text-based data. In case the addresses are identified, the script may include commands of executing a second CBM that may identify vehicle license numbers within the text-bases data. The script may include various logic elements for censoring text-based data depending on the information found in the text-based data. In an example embodiment, if the text-based data contains information about checking accounts, the user data related to user phone number and address may be censored, but if the text-based data contains information about charity organizations, the user phone number may be exposed.

In some embodiments, the text-based data may be pre-processed prior to censoring. For example, a pre-processor may remove images from the text-based data. In some embodiments, the preprocessor may remove special characters or may modify the font of the text prior to censoring the text. In some embodiments, when text-based data may be embedded in the image or video data, the pre-processor may extract the text from the text-based data. In various embodiments, in order to censor the text in text-based data, the text may need to be recognized using optical character recognition (OCR).

Figure 7:
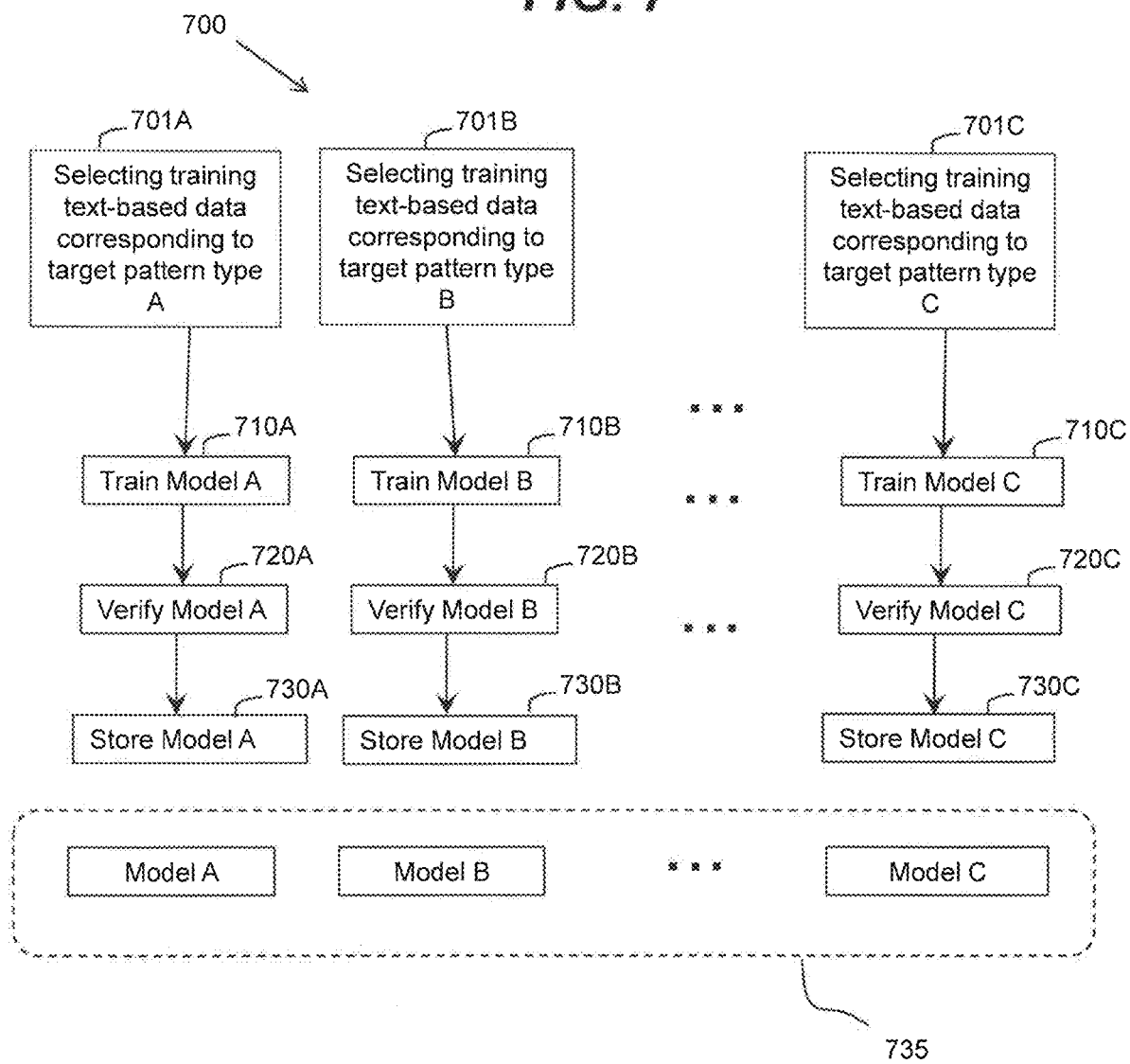
FIG. 7 depicts flowcharts of an illustrative process of text censoring based on combined computer models, consistent with disclosed embodiments.

Artificial intelligence system 130 may include multiple CBMs that may process text-based data depending on a request describing what type of data may be sensitive. For example, request may include a set of target pattern types that correspond to target data patterns with target characters that need to be censored. FIG. 7 shows schematically, a process 700 of assembling a large censoring model having multiple CBMs. Process 700 may include the steps 701A-701C for selecting training text-based data corresponding to a target pattern type. In the example of FIG. 7, step 701A may select training text-based data corresponding to target pattern type A, step 701B may select training text-based data corresponding to target pattern type B, and step 701C may select training text-based data corresponding to target pattern type C. The steps 701A-701C may be similar to steps of selecting the appropriate training text-based data as described for example in FIG. 3A by step 322. For the target pattern type A-C, the models A-C may be trained using training steps 710A-710C which may be similar to process 300 shown in FIG. 3A. Artificial intelligence system 130 then may verify the models in verification steps 720A-720C, which may be similar to process of 400 shown in FIG. 4A and store the models in steps 730A-730C. The trained and verified CBM may then be included as a part of a larger censoring model 735 having multiple CBMs. The CBM within large censoring model 735, may further include an ensemble of models that can be combined together to result in a CBM with improved accuracy.

Figure 8:
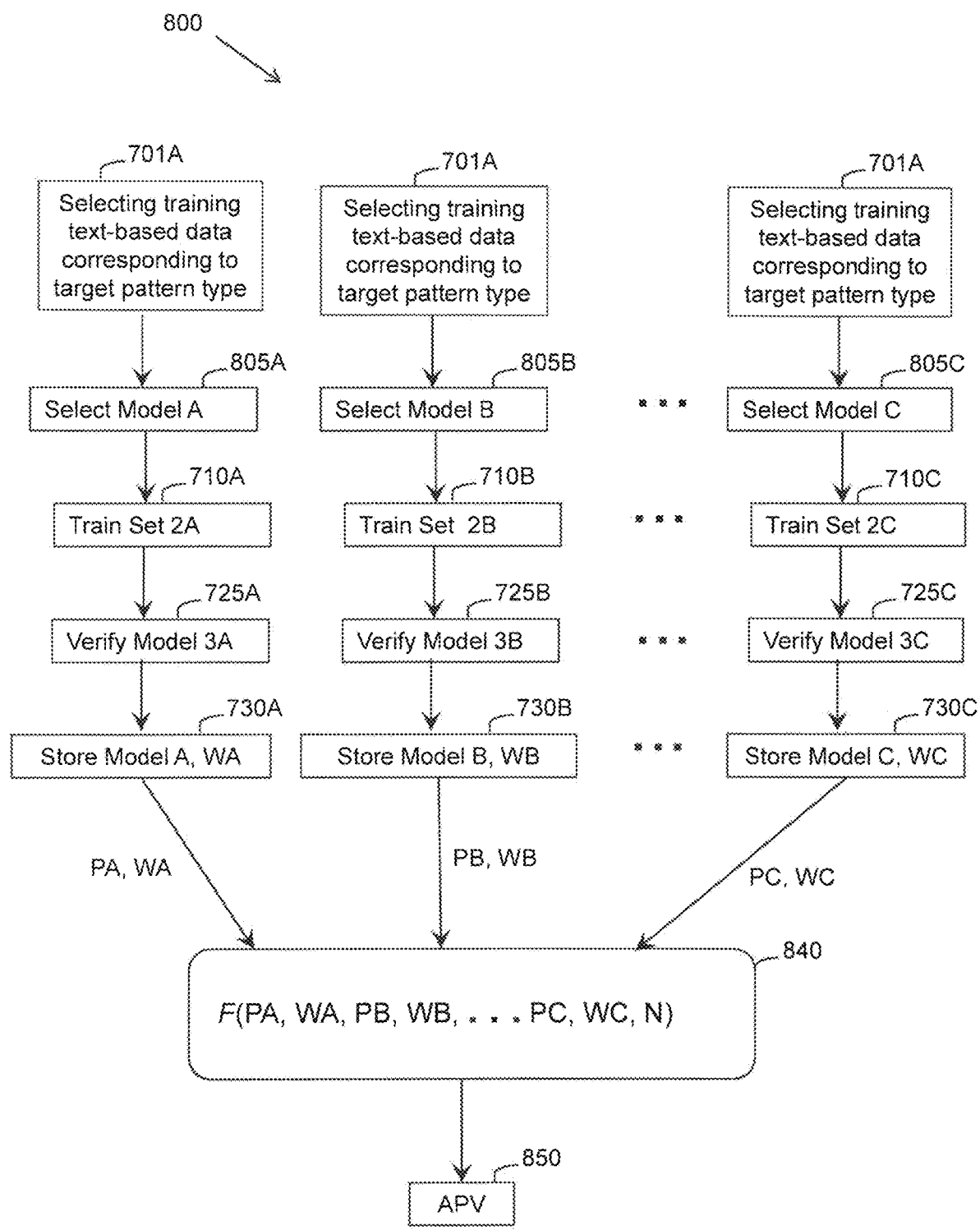
FIG. 8 depicts flowcharts of an illustrative censoring process, consistent with disclosed embodiments.

FIG. 8 illustrates a process 800, similar to process 700. Process 800 may include steps 701A-701C, 710A-710C, 725A-725C, and 730A-730C which may be similar to those described above in relation to FIG. 7. For example, FIG. 8 shows multiple steps 805A-805C of selecting models that may be trained to recognize a given target pattern type. The step of selecting a model may involve configuring the model. For example, in step 805A and 805B, models A and model B may include a neural network, but the number of hidden nodes in model A may be different from the number of hidden nodes of model B. Alternatively the model A may include a recurrent neural network and model B may include a convolutional neural network or a random forest, in various embodiments, the models A-C may be trained in steps 710A-710C on training data sets 2A-2C and verified in steps 725A-725C correspondingly on verification data sets 3A-3C. In some embodiments, the verification data sets may be the same. In some embodiments, when the models are configured differently, the training data sets 2A-2C may be the same. Additionally, or alternatively, when models are configured differently or identically, the training data sets 2A-2C may be different, leading to different models A-C. During the verification, the models A-C may be assigned an output accuracy measure WA-WB. Generally, all the models A-C may identify the sensitive data within text-based data by assigning the probability values PA-PC to text characters of the text-based data. The models that have an output accuracy measure that is below a target threshold value may be discarded. The text characters that require censorship may be assigned the probability value PA-PC close to one, and text characters that do not require censorship may be assigned the probability value PA-PC close to zero. The trained models A-C may be combined to result in an ensemble of CBMs that is also referred to as the combined CBM. In some embodiments, the models A-C may include recurrent neural networks.

In some embodiments, the combined CBM may also incorporate a language parser for text-based data. The language parser may pre-process text-based data before processing text-based data with the CBMs of the combined CBM. In some embodiments language parser may identify data objects (e.g., words, phrases, text characters) within the text-based data and labeled data objects by a tag. In some embodiments, at least some words of the text-based data may have associated tags identifying the part of speech of the words. The part of speech tags may include: "noun", "verb", "adjective", "adverb", "pronoun", "preposition", "conjunction", or "interjection". In various embodiments, the CBMs of the combined CBM may receive text-based data containing words and the associated tags for identifying the target data patterns within text-based data with improved accuracy.

In various embodiments, the models A-C may be combined using several steps. In a first step, censoring system 180 may identify the characters that need to be censored by computing probability values for all the characters in the text-based data. The combined probability value for the character may then be obtained by averaging between the probability values obtained from models A-C. The averaging may include weighting probabilities by an output accuracy measure. In an example embodiment, the averaged probability value APV may be calculated as $APV=(1/N)\Sigma p_i \cdot W_i$, where i is the index of the model (i={A, B, C}, in FIG. 8) $p_i$ is the probability value for a text character obtained from the $i^{th}$ model, $W_i$ is the output accuracy measure and N is the number of models that are used in the ensemble. The resulting probability value PAV may be used as a result of the combined CBM for identifying the sensitive characters in the text-based data that require censorship. Similar to the validation process for models A-C, the ensemble model may also be validated, and the output accuracy measure may be assigned to the ensemble of CBMs.

The ensemble model may further be evaluated for accuracy by analyzing the variance in probability values $p_i$. For example, if models A-C predict probability values $p_i$ which are mostly similar to each other, then the variance of $p_i$ is small and the ensemble model may be deemed accurate. On the other hand, if the value $p_i$ is changing considerably from model A to model C than the variance may be large, and the ensemble model might have reduced accuracy. The variance of $p_i$ may be calculated as $VarP=(1/N)\Sigma(p_i-APV)^2 \cdot W_i$, where APV is the averaged probability value, i is the index of the model (i={A, B, C}, in FIG. 8), $p_i$ is the probability value for a text character obtained from the $i^{th}$ model, $W_i$ is the output accuracy measure and N is the number of models that are used in the ensemble.

Figure 9:
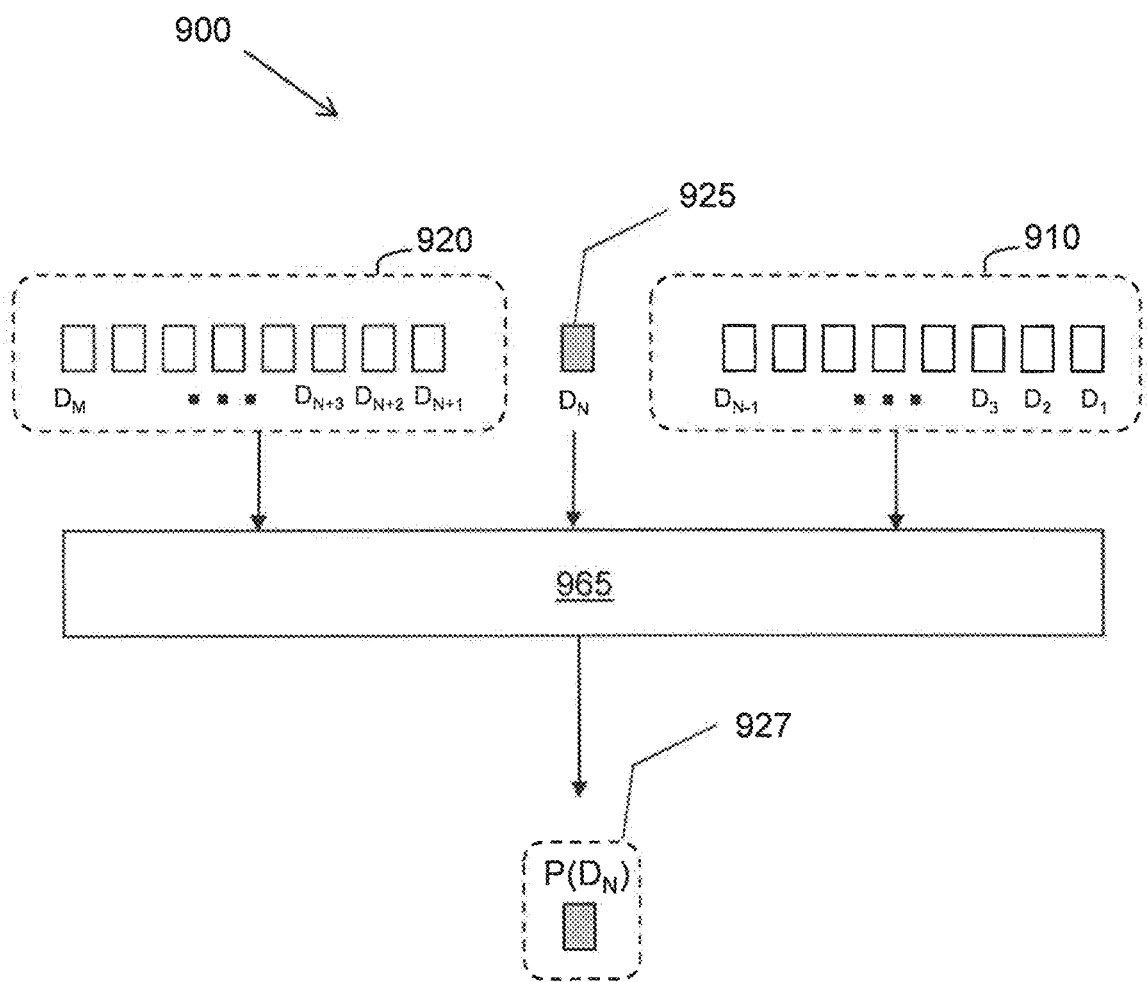
FIG. 9 is a flowchart of an illustrative process of characterizing a unit of information, consistent with disclosed embodiments.

In general, besides averaging probability values, other functions may be used to infer about probability value of the combined CBM. As shown in step 840 of FIG. 8, function $F(p_i, W_i, N)$ may be selected, and the arguments to the function may include probability values $p_i$, output accuracy measures W and the number of models N. The function $F(p_i, W_i, N)$ may be used to obtain the probability value APV of the text character output in step 850, FIG. 9 shows an illustrative process 900 for operation of a CBM 965, Process 900 may be performed by, for example, processor 150 of censoring system 180. It is to be understood, however, that one or more steps of process 900 may be implemented by other components of system 130 (shown or not shown), including, for example, one or more of devices 120A, 120B, and 120C.

In an example embodiment, CBM 965 may receive a first stream of characters in step 910 with characters D1-DN−1, receive a character DN in step 925 that requires its probability value to be evaluated, and also receive a second stream of characters DN+1-DM in step 920. In some embodiments, the first stream of characters may include several tens of characters or, in some cases 50-100 characters. In some cases, it may include several hundred characters. In some embodiments, the second stream of characters may include several tens of characters or, in some cases 50-100 characters. In some cases, the first and the second stream of characters may include several hundred characters. The CBM may process the first and the second stream of characters, and may determine the probability value of character DN. In an embodiment, both the characters and the probability values that have already been determined for some of the characters (such as characters D1-DN−1) may be processed by CBM for determining the probability value of the character DN. In step 927 the CBM may output the probability value P(DN) for the character DN. In an embodiment, CBM may include a recurrent neural network. In an alternative embodiment, the CBM may include a convolutional neural network or random forest.

Figure 10:
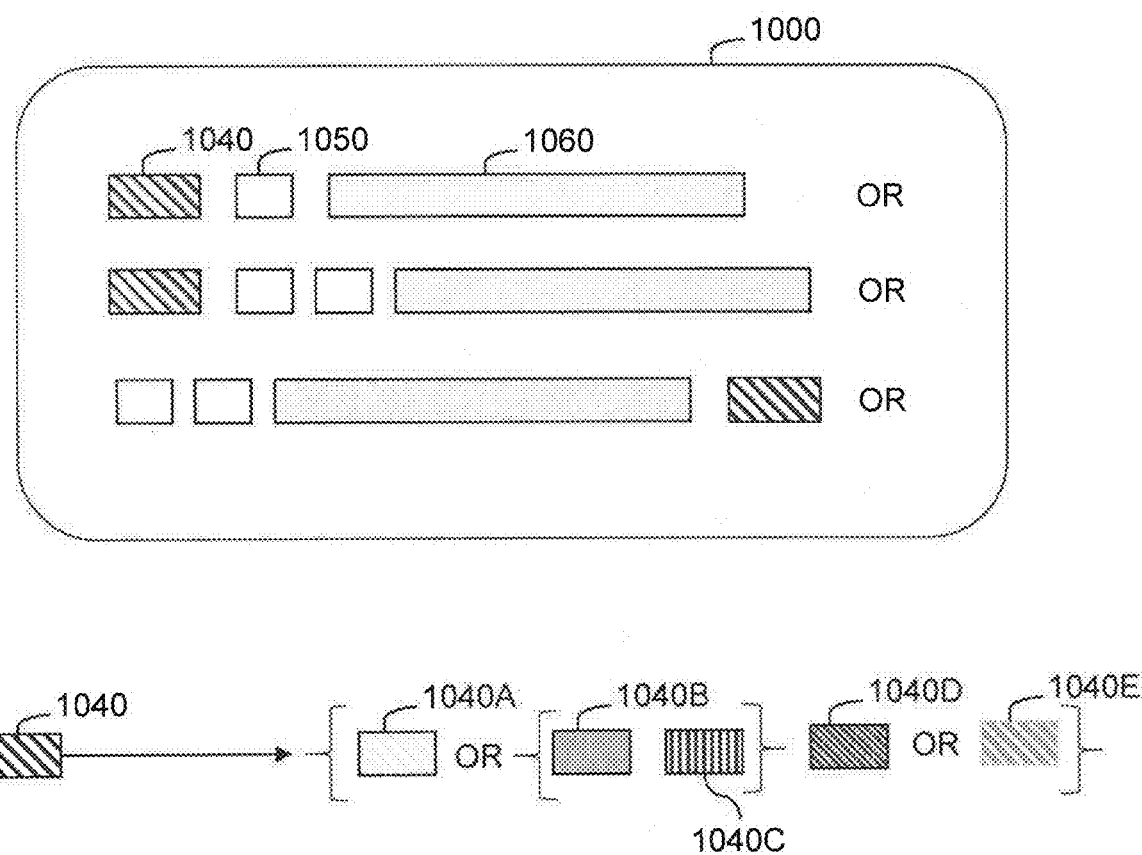
FIG. 10 shows an example of a graphical representation of a pattern that may be identified within a text.

FIG. 10 schematically illustrates an example of a target data pattern 1000 that may be used to identify sensitive data requiring censoring. For example, the target data pattern may include a target identifying string 1040, space or filler string 1050 and a sensitive information string 1060, The target identifying string 1040 may be a string such as "Phone number", "SSN #" and/or similar identifier that is followed (or preceded) by a sensitive information string 1060 that contains target characters that need to be censored. For example, the sensitive information string 1060 may contain a social security number. In some embodiments, the sensitive information string may be separated from the identifying word by one or more filler words. The filler word may be any word that does not directly relate to the sensitive information. For example, the target data pattern "Social security number of the first client is 123-11-1245" contains the target identifying words "Social security number", the filler words "of the first client is", and the sensitive information string "123-11-4245". As shown in FIG. 10, the target identifier string may contain many different possibilities for a target pattern type. For example, for the target pattern type relating to a social security number, the target identifier string may include "SSN" or "SSN #" "Social Security Number" or "soc." or/and the like.

In various embodiments training of CBMs may require a large volume of training text-based data. Artificial intelligence system 130 may be configured to generate the training text-based data, such as customer financial information, patient healthcare information, and/or the like, by a data generation model (DGM). The DOM may be configured to produce fully training data with similar structure and statistics as the actual text-based data. The training text-based data may be similar to the actual data in terms of values, value distributions (e.g., univariate and multivariate statistics of the training text-based data may be similar to that of the actual text-based data), structure and ordering, or the like. In this manner, the text-based data for the CBM can be generated without directly using the actual text-based data. As the actual text-based data may include sensitive information, and generating the text-based data model may require distribution and/or review of training text-based data, the use of the training text-based data can protect the privacy and security of the entities and/or individuals whose activities are recorded by the actual text-based data.

Artificial intelligence system 130 may generate the training text-based data by providing text-based data generation request to DGM. The text-based data generation request may include parts of the text-based data, the type of a model for generating the text-based data, and/or instructions describing the type of text-based data to be generated. For example, the text-based data generation request may specify a general type of model (e.g., neural network, recurrent neural network, generative adversarial network, kernel density estimator, random data generator, or the like) and parameters specific to the particular type of model the number of features and number of layers in a generative adversarial network or recurrent neural network).

In various embodiments, different types of DGMs may be used to generate training text-based data that may have different string metrics. For example, the generated training text-based data may have different Levenshtein distances when compared to the target text-based data. In an example embodiment, a DGM may include obtaining text-based data and substituting characters in text-based data with random characters. In some embodiments, alphabetical random characters may substitute alphabetical text-based characters, and numerical random characters may substitute numerical characters of the text-based data. In various embodiments, the formatting and special characters, including space characters and tab characters may not be substituted. In some example embodiments of a DGM, the generating of training text-based data may include obtaining text-based data and substituting words in the text-based data with random words. In some embodiments, the substituting words may be synonyms of the words that are being substituted. In some embodiments, a DGM may first parse the text-based data and identify parts of the speech for the words within the text-based data. The DGM may randomly generate substitute words with the same part of speech as the words that are being substituted.

In some embodiments, a DGM may generate training text-based data following a template. The template may be a set of tokens that may be substituted by target characters. For the token within a template, DGM may randomly select a string of characters from a set of strings corresponding to a given token. For example, for a token "NAME" the DGM may select a string corresponding to one of the names from a set of names, and for a token "STREET" the DGM may select a combination of numbers and letters that may correspond to an address. The template may be entirely composed of tokens, or it can also contain regular text characters.

In some embodiments, a DGM may be configured to generate validation text-based data. The validation text-based data may be similar to a training text-based data. In an example embodiment, validation text-based data may include numerical or alphabetical tags identifying target characters that need to be censored. For example, the numerical tag zero may indicate that the character does not need to be censored, and the tag one may indicate that the character needs to be censored.

Figure 11:
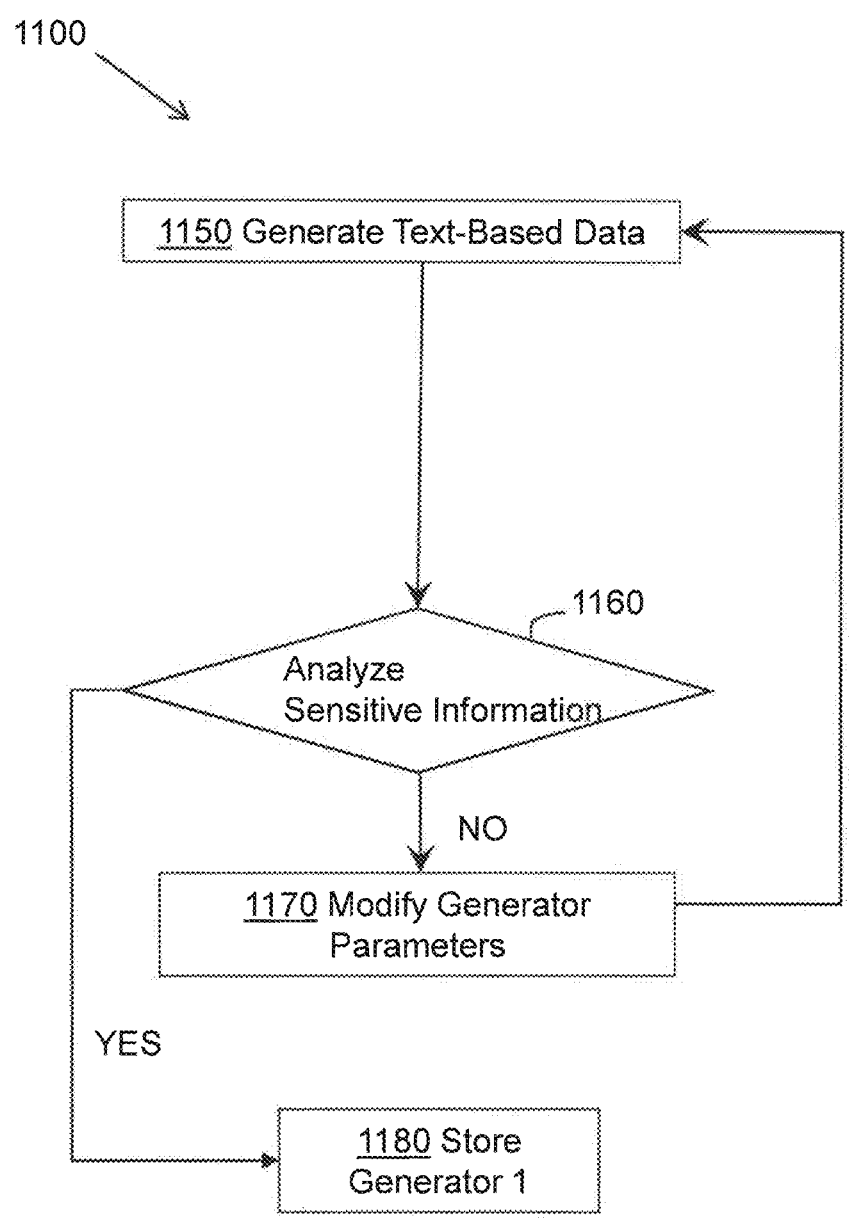
FIG. 11 is a flowchart of an illustrative process of training a text generator, consistent with disclosed embodiments.

FIG. 11 depicts a process 1100 of training DGM. Process 1100 may be performed by, for example, processor 150 of censoring system 180. It is to be understood, however, that one or more steps of process 1100 may be implemented by other components of system 130 (shown or not shown), including, for example, one or more of devices 120A, 120B, and 120C.

In step 1150 process 11 may proceed to generate training text-based data containing target data patterns corresponding to target data patterns typically found in text-based data. In step 1160 the trained CBM may be used to identity the target data patterns for one or more target pattern types in the generated training text-based data. In step 1150, DGM may, for example, generate the training text-based data for identifying social security numbers as well as the phone numbers. In order to see if the training text-based data contains any relevant target data patterns, the trained CBMs may be used to identify target data patterns containing social security numbers as well as phone numbers in step 1160. For example, a list trained CBM may identify social security numbers, and the second trained CBM may identify phone numbers. The target data patterns may be identified in step 1160 using various CBMs. In step 1160 artificial intelligence system 130 may be configured to analyze if the generated training text-based data contains sensitive information by processing the generated training text-based data with CBMs. If the generated training text-based data does not contain any target data patterns related to the sensitive information (step 1160, NO) such as social security numbers or phone numbers, or if the generated training text-based data contains only a small number of target data patters related to the sensitive information, the parameters of the DGM may be modified in step 1170 to result in improvements in generation of the text-based data. Process 1100 may then proceed back to step 1150. Alternatively, if the generated training text-based data contains target data patterns related to sensitive information (step 1160, YES), it may indicate that DGM is trained. The trained DGM may be stored within the computer memory for further use in step 1180.

Figure 12A:
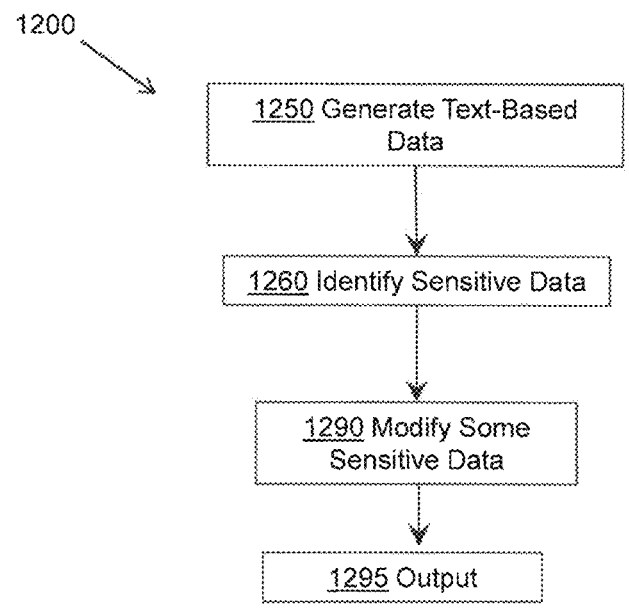
FIG. 12A is a flowchart of an illustrative process for modifying sensitive data, consistent with disclosed embodiments.

FIG. 12A shows an example process 1200 of generating training text-based data using a combination of DGM and CBM. Process 1200 may be performed by, for example, processor 150 of censoring system 180. It is to be understood, however, that one or more steps of process 1200 may be implemented by other components of system 130 (shown or not shown), including, for example, one or more of devices 120A, 120B, and 120C.

Figure 12B:
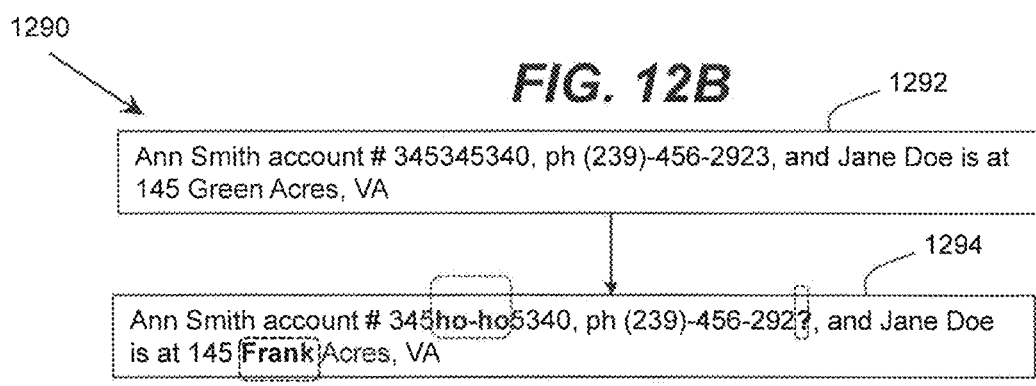
FIG. 12B is a flowchart of an illustrative example of modifying sensitive data, consistent with disclosed embodiments.

In an illustrative embodiment, in step 1250 the training text-based data may be generated by a DGM similar to the step of 1150 shown in FIG. 11. In step 1260 the generated text-based data may be analyzed to identify the target data patterns using CBM similar to the step of 1150 shown in FIG. 11. Subsequently, in step 1290, artificial intelligence system 130 may modify at least some data by replacing the target characters within the identified target data patterns by random or predetermined characters and generate a new training text-based data with modified characters that may be output in step 1295. For example, FIG. 12B shows exemplary details of the step 1290, including original text 1292 with some of the identified target data patterns being "account #345345340" and "Jane Doe * 145 Green Acres, Va." (characters "*" may relate to filler characters that are not an important part of the target data pattern). The target data patterns may be modified to result in new training text-based data 1294 with the patterns such as "account #345ho-ho5340", where the text characters "ho-ho" replaced previous characters 34. FIG. 12B shows other possible modification of the target data patterns. For example, the target data pattern containing phone number is modified to result in the last character of the phone number replaced by a question mark. Similarly, the address of Jane Doe in the target data pattern is modified to replace the word "Green" with "Frank". The newly generated text-based data may be used to train a CBM and may improve CBM output accuracy measure by training CBM on text-based data that contains confusing counter example target data patterns.

Figure 13:
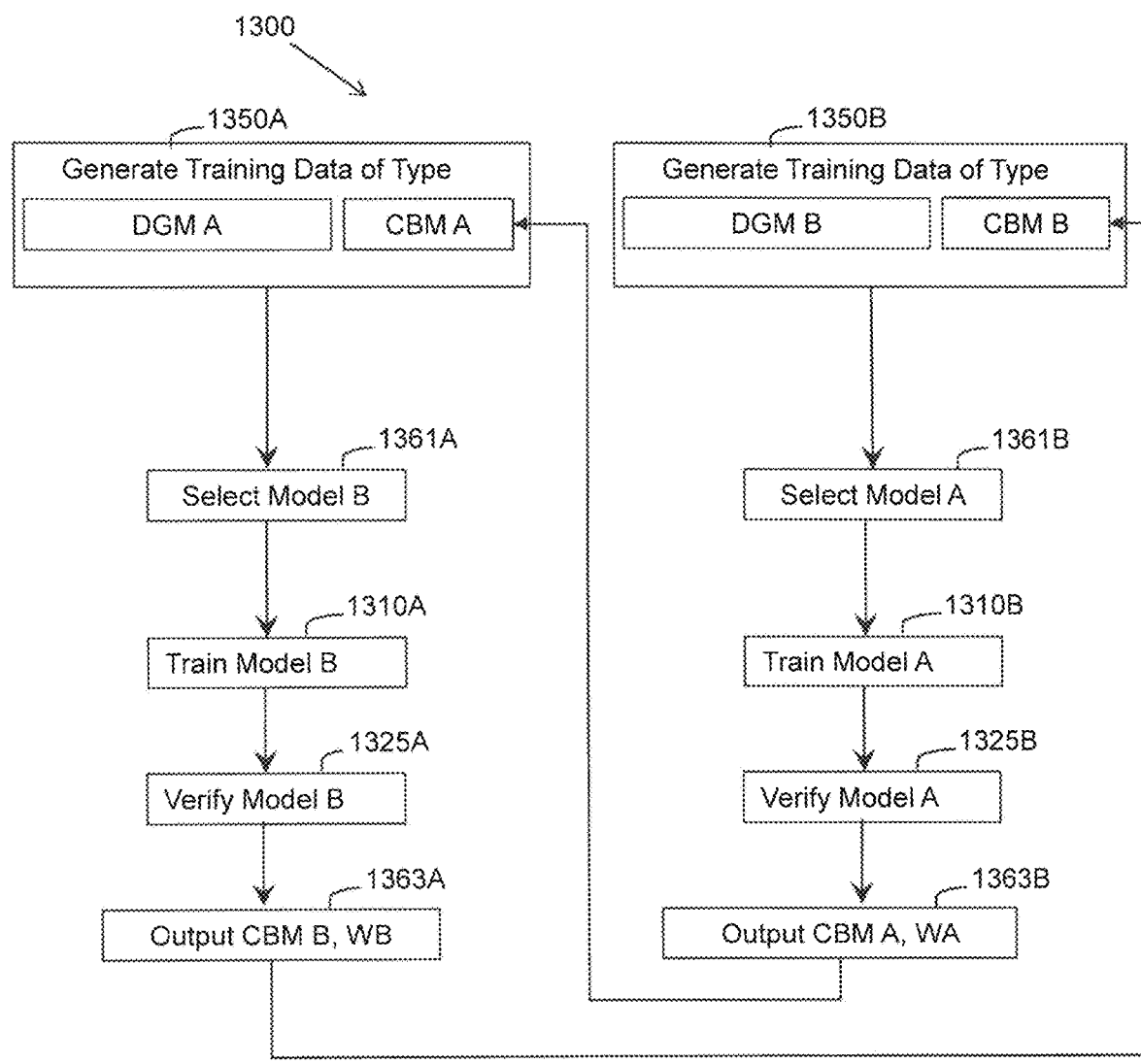
FIG. 13 is a flowchart of an illustrative process for of text generators interacting recursively, consistent with disclosed embodiments.

In various embodiments, the training text-based data may be generated by first generating the context data and then embedding target data pattern containing target characters in the context data. For example, the context data may first be randomly generated and then target data pattern containing target characters be embedded in different portions of the randomly generated context data, ds FIGS. 12A and 12B show that the DGM and CBM may be used together to generate training text-based data, FIG. 13 shows an illustrative embodiment in which a plurality of DGMs and CBMs are trained together though iterative process. For example, in steps 1350A-1350B the DGM A and DGM B and CBM A and CBM B are used together (in a similar process as described in FIG. 12A in relation to process 1200) to generate a first set of training text-based data. The training text-based data may be used to train the CBM B and CBM A in subsequent steps. For example, in steps 1361A and 1361B the CBM B and CBM A may be selected for training purposes. In steps 1310A and 1310B the CBMs B and A may be trained, and in steps, 1325A and 1325B CBMs B and A may be verified. The trained CBMs B and A as well as output accuracy measures WB and WA corresponding the CBMs B and A may then be output in step 1363A and 1363B and combined with a corresponding generator in step 1350A and 1350B to produce a second set of training text-based data. The steps 1361A an 1361B, may be similar to step 805A and 805B shown in FIG. 8. The steps 1310A and 1310B, may be similar to step 810A and 810B shown in FIG. 8, and steps 1325A and 1325B may be similar to steps 825A and 825B shown in FIG. 8.

The newly obtained set of training text-based data may be used to further train the CBMs using the steps of 1361, 1310 and 1325A and 1325B. In some embodiments, more than two CBMs and DGMs may be used to further improve the training of CBMs. While FIG. 13 does not specifically show that DGMs may be further improved, the steps in FIG. 13 may be combined with steps in FIG. 11 to improve the DGM through a feedback process.

Artificial intelligence system 130 may be configured to determine how the text-based data may be censored depending on the user profile of receiving party 140 as described above. Additionally, or alternatively, artificial intelligence system 130 may be configured to determine how the text-based data may be censored depending on security of a network used to transmit the text-based data.

Figure 14:
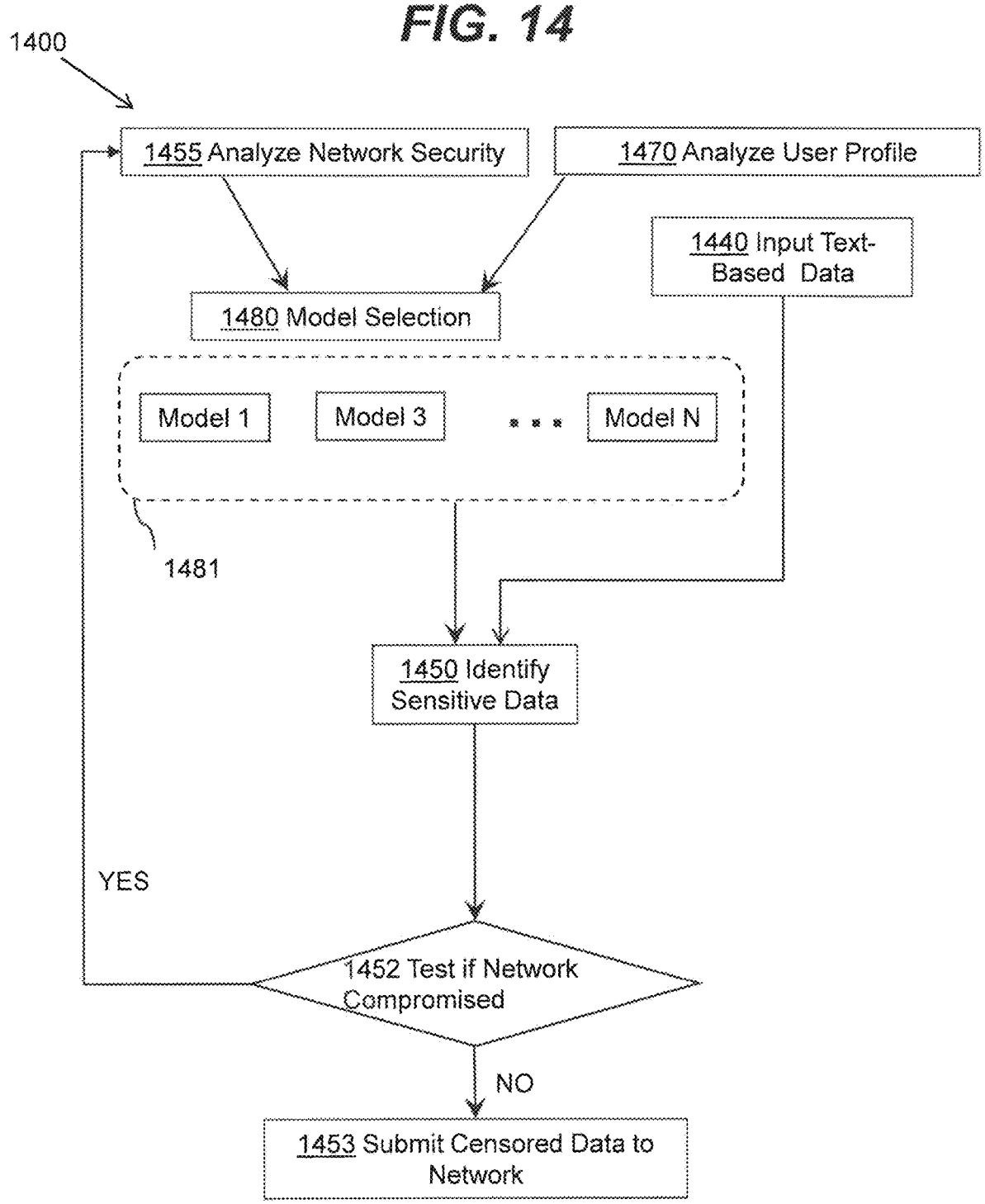
FIG. 14 is a flowchart of an illustrative process of censoring sensitive data, consistent with disclosed embodiments.

FIG. 14 illustrates a process of censoring text-based data subject to network security and user profile security characteristics, Process 1400 may be performed by, for example, processor 150 of censoring system 180. It is to be understood, however, that one or more steps of process 1400 may be implemented by other components of system 130 (shown or not shown), including, for example, one or more of devices 120A, 120B, and 120C.

In step 1470, artificial intelligence system 130 may analyze user profile of receiving party 140 to obtain security characteristics for censoring text-based data, for example, as has been described by process 600 shown in FIG. 6. In step 1455, artificial intelligence system 130 may analyze security of a network, for example network 141 shown in FIG. 1. For example, if network 141 is not secure, artificial intelligence system 130 may choose a first set of target pattern types for censoring the text-based data. If network 141 is secure, the system may choose a second set of target pattern types for censoring the text-based data. For instance, if the request is made via the virtual private network, the second target pattern types may be used to censor the data.

In some embodiments, artificial intelligence system 130 may detect that network 141 is compromised for example by eavesdropping attack and alter the censoring of the text-based data. The eavesdropping attack may happen when there is an attempt to steal information that computers, smartphones, or other devices transmit over a network. In general, such an attack may be identified by analyzing the time that it takes for data to be transmitted from a server system to a receiving system. For example, if transmission time suddenly changes, then the system may experience an eavesdropping attack. For cases of eavesdropping attack, the text-based data may be censored.

Once the target pattern types for censoring have been identified based on the profile security characteristics of the user and security characteristics of network 141, artificial intelligence system 130 may then identify, in step 1480, a set of CBMs needed to censor the text-based data and combine multiple models to result in combined model 1481 to identify and censor part of the text-based data in step 1450, which may be similar to model described in step 684 of process 600 shown in FIG. 6. The text-based data may be received in step 1440 by artificial intelligence system 130, and artificial intelligence system 130 may check if network 141 has been compromised in step 1452. Artificial intelligence system 130 may submit the censored text-based data to network 141 in step 1453. If the network 141 is compromised, (step 1452, YES) artificial intelligence system 130 may proceed to step 1455 for analyzing network security. If the network 141 is not compromised (step 1452, NO) artificial intelligence system 130 may proceed to step 1453 of submitting the censored data to network 141.

Figure 15:
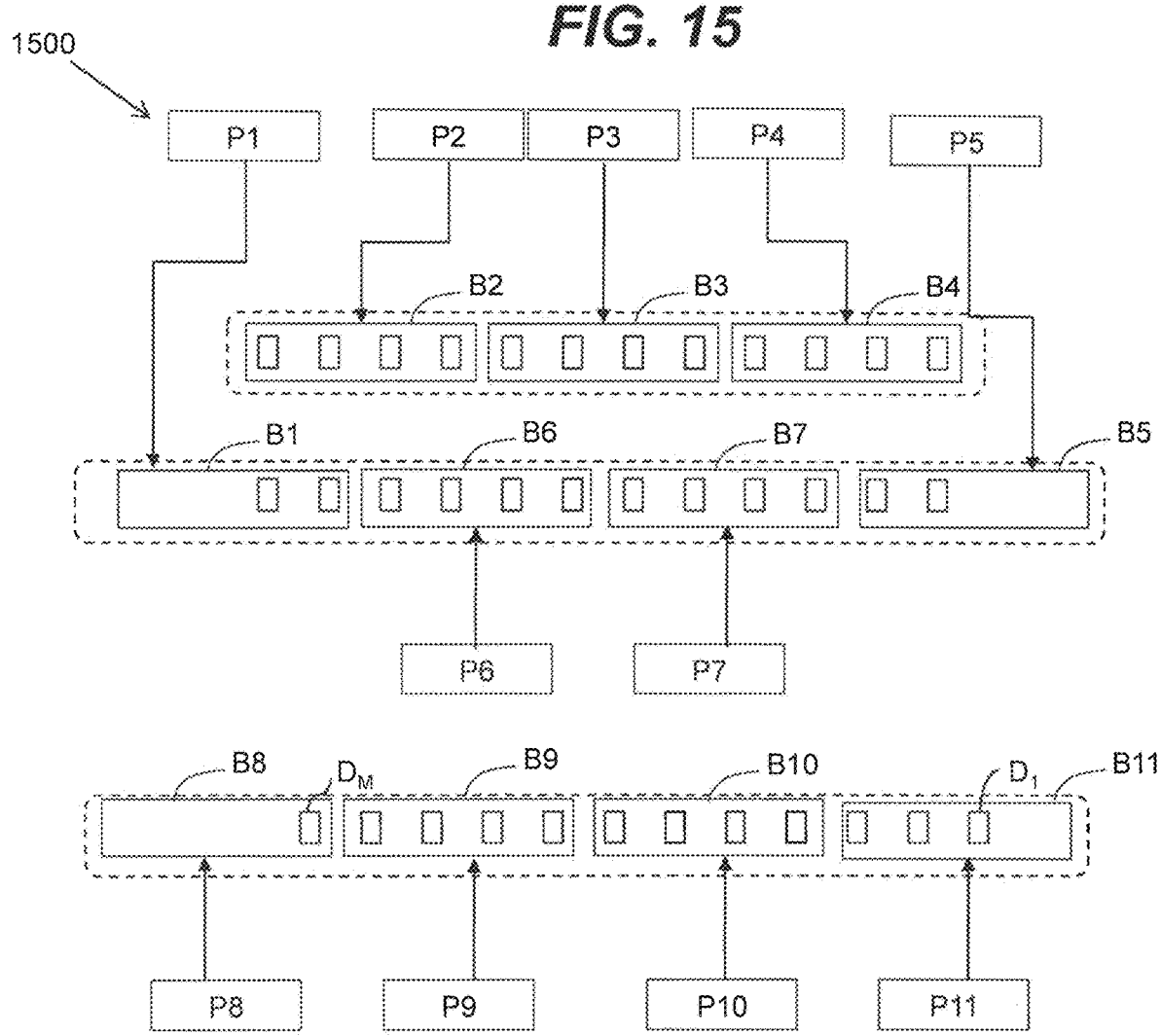
FIG. 15 shows a diagram of an illustrative system for training a computer model, consistent with disclosed embodiments.
Figure 16:
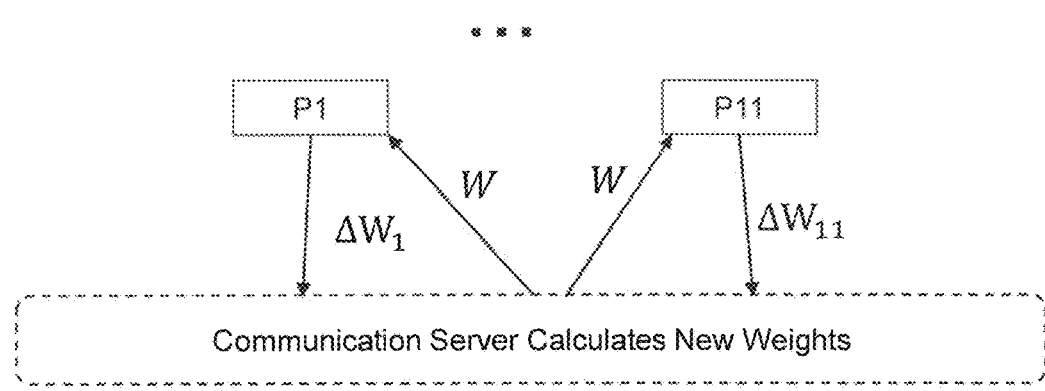
FIG. 16 is a flowchart of an illustrative update process of training a computer-based model, consistent with disclosed embodiments.

In order to train CBM for identifying target data patterns within text-based data, large number of training text-based data may need to be processed. Generally, training of CBM may take a long time if the training is done on a single processor. In order to reduce the training time, the text-based data may be subdivided into segments, and CBM may be trained on a separate processor using a segment of the text-based data. FIG. 15 shows text-based data separated in segments B1-B11. For example, text-based data may be first partitioned into segments B2, B3, and B4 and at least one segment may be used to train CBM on a separate processor. For example, the segment B2 may be used to train CBM on a processor P2, the segment B3 may be used to train CBM on a processor P3, and the segment P4 may be used to train CBM on a processor P4. Additionally, the text-based data may be partitioned differently in segments B1, B6, B7 and B5. FIG. 15 shows that segments B2 overlaps with segments B1 and B6, segment B3 overlaps with segments B6 and B7, and segment B34 overlaps with segments B7 and B5. Segments B1, B6, B7, and B5 may be used to train CBM on corresponding processors P1, P6, P7, and P5. Additionally, or alternatively, the text-based data may be further partitioned in other segments. For example, the text-based data may be partitioned into segment B8, B9, B10, B11 overlapping with previously partitioned segments. One or more individual segments may then be used to train CBM on a different processor. In a training step, the corresponding processor may take text-based data as an input, evaluate probability values for the text characters, compare the probability values with target probability values and adjust the model parameters to approach target probability values. The parameters calculated by different processors may be communicated to server 160, as shown for example in FIG. 16. As in FIG. 16, server 160 may average the calculated parameters and distribute them back to processors for updating the CBMs. In general, the averaging of model parameters may be done by also weighting the model parameter by the output accuracy measure of the CBM model. For example, if processors P1 and P2 have CBMs with output accuracy measure $W_1$ and $W_2$, then the parameters $u_1$ and $u_2$ for CBMs on P1 and P2 may be averaged by $u=(W_1 u_1 + W_2 u_2)/2$. The described procedure for processing text-based data in parallel is only illustrative and various other approaches may be used to reduce the training time for the CBMs.

In some embodiments, CBMs may be trained to identify target data patterns within text-based data using a training text-based data that may not be shared. For example, the training text-based data may contain sensitive information that should not be shared. In some embodiments, the training text-based data may contain many samples of sensitive information such as addresses, phone numbers, names, business related information, financial information and other sensitive records.

In various embodiments, censoring system 180, shown in FIG. 1, may be configured to train CBM models, store CBM models and deploy CBM models for censoring text-based data. In some embodiments, the trained CBM models may be stored within the database 170. In some embodiments, CBM models may include neural networks, recurrent neural networks, convolutional neural networks, random forests and/or the like. In some embodiments, censoring system 180 may be configured to support generation and storage of synthetic data as well as training and storage of DGMs. Censoring system 180 may include interface for configuring parameters of the CBMs as well as parameters of DGMs. Censoring system 180 may include computing resources such as processor 150 and database 170, as well as software for optimizing and deploying CBMs and DGMs. The software for optimizing and deploying CBMs and DGMs may be configured to communicate with server 160.

In some embodiments, the censoring system 180 may provide an interface for the user to enter text-based data. In some embodiments, the interface may be a webpage, and in some embodiments, the interface may be served to a client application of the user. In some embodiments, the text-based data may be transmitted to censoring system 180 through server 160 and processed by a CBM. In some embodiments, the CBM may identify sensitive information, and censor the text-based data by swapping out sensitive text with a random token, replacing the sensitive text with a black bar, removing completely the sensitive text, removing a sentence containing the sensitive text, removing a paragraph containing the sensitive text or, in some cases, censoring the entire text-based data containing the sensitive text by preventing the text-based data to be delivered to a recipient, such as receiving party 140. In some embodiments, receiving party 140 and the users 110A-110C may be informed that the submitted text-based data has been censored, and in some embodiments, receiving party 140 and the users 110A-110C may be informed that the submitted text-based data was not transmitted.

Figure 17A:
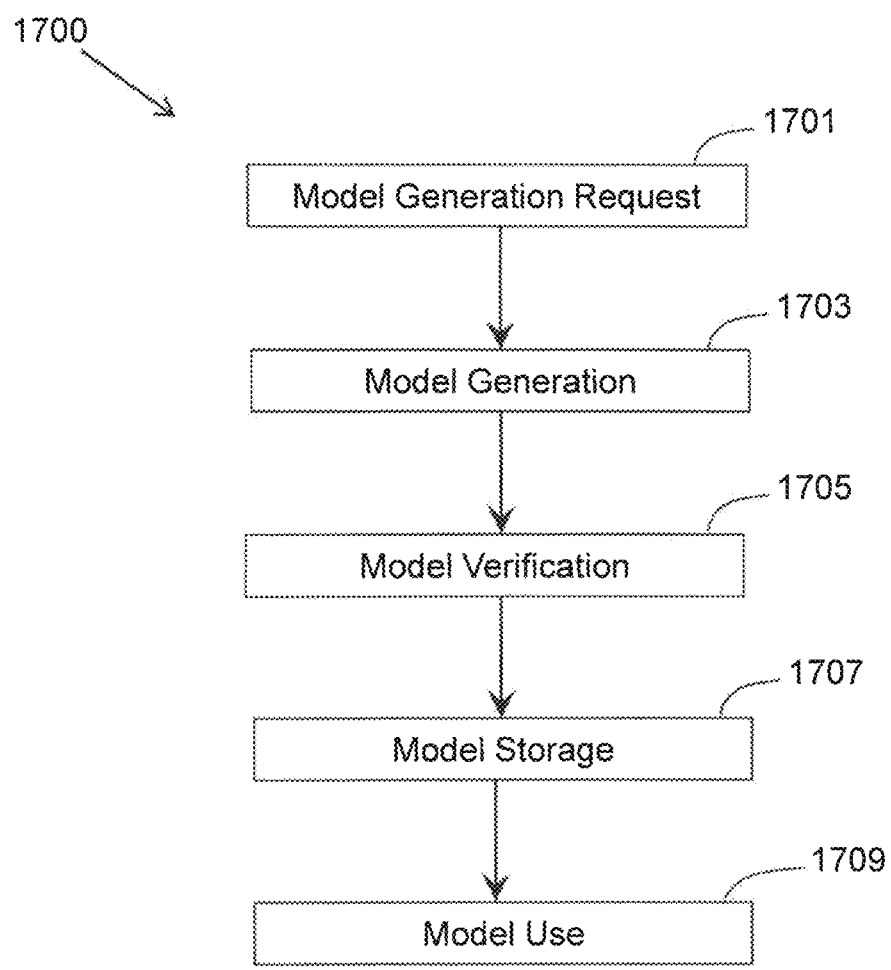
FIG. 17A is a flowchart of an illustrative process of generating a computer-based model consistent with disclosed embodiments.

FIG. 17A is a flowchart of an illustrative process 1700 for generating computer-based models. In step 1701, censoring system 180 may receive a computer-based model generation request. The CBM generation request may be related to target data patterns associated with target pattern type that requires censorship. The CBM generation request may include data and/or instructions describing the type of CBM to be generated. For example, the CBM generation request may specify a general type of CBM (e.g., neural network, recurrent neural network, convolutional neural network, or the like) and parameters specific to the particular type of model (e.g., the number of features and number of layers in a convolutional neural network or recurrent neural network).

In step 1703, censoring system 180 may generate a CBM by training the CBM using training text-based data. Step 1703 may be similar to step 710A of process 700 depicted in FIG. 7. The training text-based data may be generated by a DGM or may include actual data maintained by database 170 of censoring system 180. In step 1703, the training process may include selecting model parameters (e.g., number of layers for a neural network) and updating training parameters (e.g., the frequency of target data patterns within the training text-based data generated by a DGM).

In step 1705, the CBM may be verified by evaluating the performance of the CBM on verification text-based data. Step 1705 may be similar to step 720A of process 700 depicted in FIG. 7. When the performance of the CBM satisfies performance criteria, censoring system 180 may be configured to store the CBM in step 1707. In step 1709, the censoring system 180 may use the CBM to censor the text-based data. For example, the censoring system 180 may use the CBM via an application programming interface (API) to censor the text-based data.

Figure 17B:
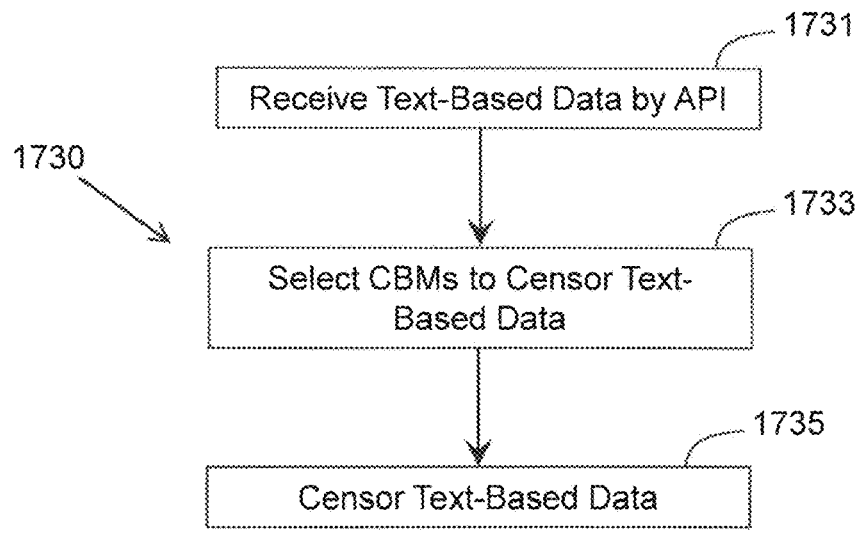
FIG. 17B is a flowchart of an illustrative process of censoring text-based data consistent with disclosed embodiments.

FIG. 17B is a flowchart of an illustrative process 1730 of censoring text-based data using CBMs. In step 1731, an AFT may be configured to receive one or more documents containing text-based data from users 110A-110C via server 160. In step 1733, the API may interface with censoring system 180 by requesting censoring system 180 to identify target data patterns corresponding to target pattern types that need to be censored for one or more received documents. Censoring system 180 may receive request from the API and select CBMs to censor the received text-based data. In step 1735, one or more CBMs may censor a single document, with individual CBMs censoring target data patterns corresponding to a specific target pattern type within the document. In various embodiments, the API of censoring system 180 may receive an uncensored document as input and output a censored document.

Figure 17C:
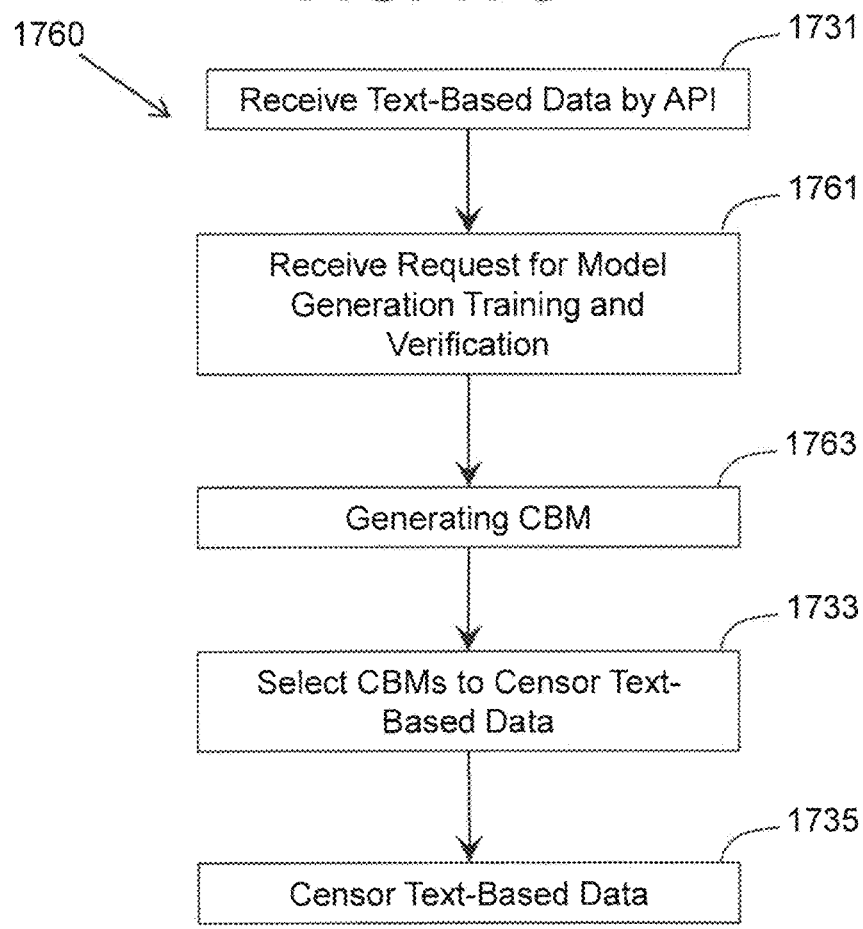
FIG. 17C is a flowchart of an illustrative process of censoring text-based data consistent with disclosed embodiments.

FIG. 17C is a flowchart of an illustrative process 1760, similar to process 1730 with additional steps of 1761 and 1763. In step 1761 of process 1760, censoring system 180 may receive a request for CBM generation, training and verification. The request may be related to target pattern type and associated target data patterns that require censorship. For example, request may include step 201 of process 200 depicted in FIG. 2 of receiving target pattern type that require censorship. In step 1763, censorship system 180 may be configured to generate a CBM model. The step 1763 may be similar to process 1700.

Figure 18:
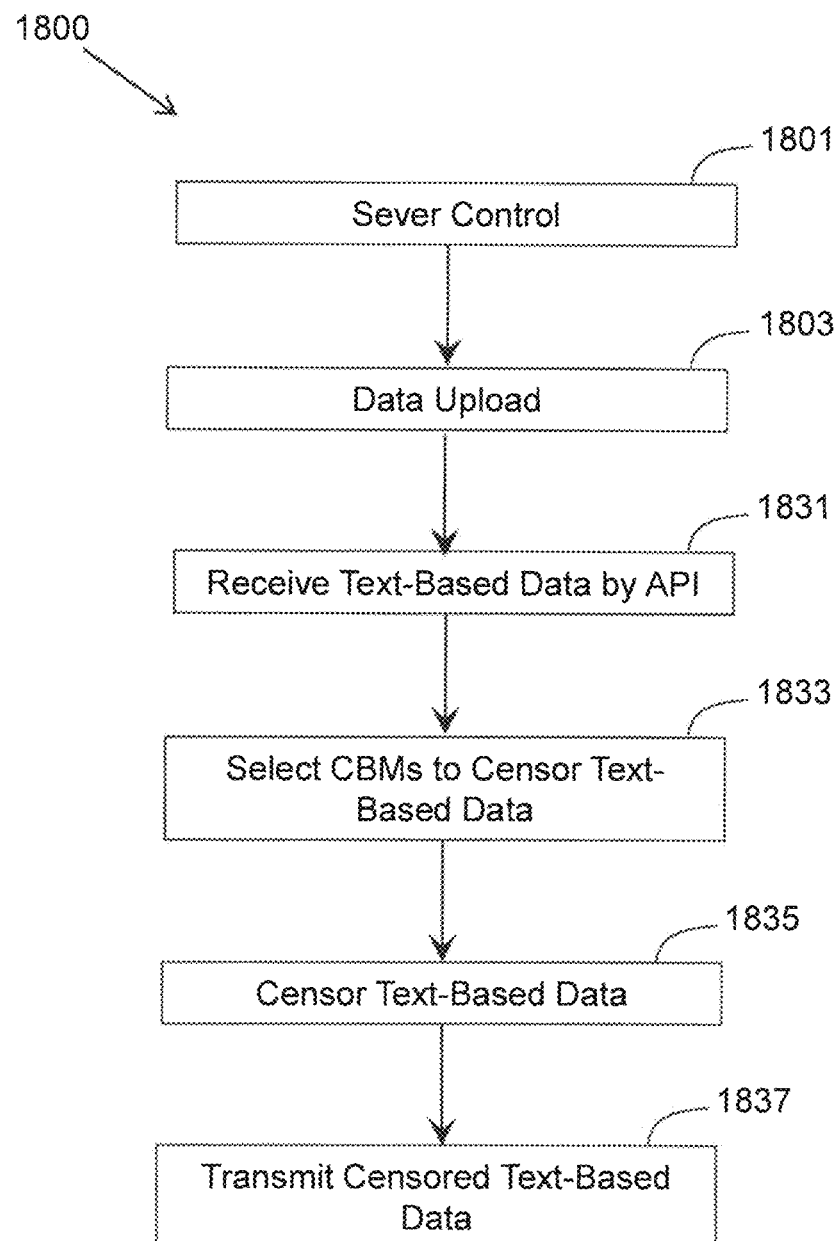
FIG. 18 is a flowchart of an illustrative process of managing a process of censoring text-based data consistent with disclosed embodiments.

In some embodiments, censoring system 180 may be managed by an administrator. FIG. 18 shows a flowchart of an illustrative process 1800 of managing a process of censoring text-based data. In step 1801, the administrator may monitor the activity of server 160. For example, the administrator may monitor the traffic through the server 160, and may stop and start server 160. In step 1803, the administrator may select the target pattern types that require censorship. For example, the administrator may select the target pattern types depending on receiving party 140 permission levels. For example, the administrator may be presented with receiving party 140 user profile that may be received by artificial intelligence system 130 in step 670 of process 600 depicted in FIG. 6. In step 1803, the administrator may provide dataset of target pattern types that require censorship to censoring system 180 by uploading the dataset to the API, which in turn, may upload the dataset to database 170. For example, the target pattern types may be entries in a spreadsheet, and the administrator may upload the spreadsheet containing target pattern types to the API of censoring system 180. Steps 1831 and 1835 of process 1800 may be similar to steps 1731 and 1735 of process 1730 shown in FIG. 17B. In step 1833, however, censoring system 180 may select a set of trained CBMs for identifying target data patterns and for censoring target data patterns corresponding to a target pattern type. In some embodiments, at step 1833, if a CBM is not available for censoring target data patterns corresponding to a new target pattern type, a new CBM may be trained on demand to identify new target data patterns corresponding to the new target pattern type. The new CBM may be trained with training text-based data that may be generated by a DGM. Additionally, or alternatively training text-based data may be provided by the administrator of censoring system 180. In step 1837, censoring system 180 may execute post command via the API and forward the censored emails to the email server for transmitting the censored emails to receiving party 140. In an illustrative embodiment, when censoring credit card and social security numbers in text-based data such as emails, censoring system 180 may replace the credit card number in the emails with the token "CENSORED CREDIT CARD" and the social security number with the token "CENSORED SSN".

In various embodiments, the censoring of the text-based data may be done in real time and/or on demand. For example, the text-based data may include an email, and the text-based data may be censored by asking the user to identify what type of data the user may require to be censored. In some embodiments, artificial intelligence system 130 may include a user graphical interface that prompts the user to censor various types of data. For example, the graphical user interface may include drop down menus with various censoring options. For instance, the drop-down menu may have options of censoring "Address", "Social Security Number", "Phone Number" and/or the like. A user may be allowed to choose one or more types of data that require censorship, in various embodiments, the text-based data may be processed by CBM, and the censored text-based data may be shown to the user for verification prior to submitting the censored text-based data via network 141.

Figure 19:
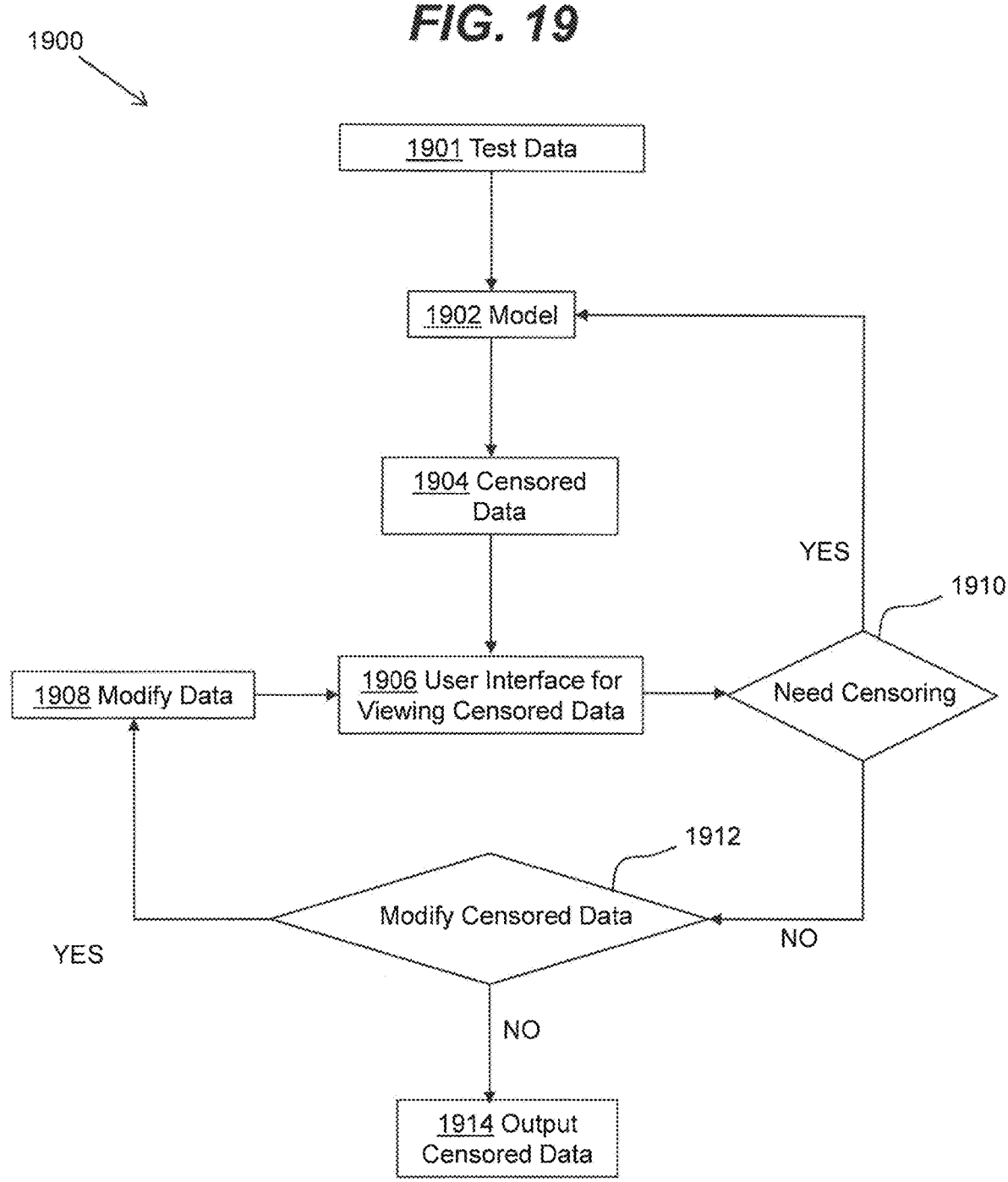
FIG. 19 is a flowchart of an illustrative process for sending a censored text, consistent with disclosed embodiments.

FIG. 19 shows a process 1900 for censoring text-based data in real time. Process 1900 may be performed by, for example, processor 150 of censoring system 180. It is to be understood, however, that one or more steps of process 1900 may be implemented by other components of system 130 (shown or not shown), including, for example, one or more of devices 120A, 120B, and 120C.

Process 1900 may include a step 1901 of acquiring the text-based data, for example as described above in relation to receiving text-based data in step 202 of process 200. At step 1902 system 130 may process the text-based data using CBM resulting in censored data that may be output to the user in step 1904. The steps 1902 and 1904 may be similar to steps 206 and 208 of process 200 shown in FIG. 2. The censored data may be displayed to the user in step 1906 for verification of the censorship process in step 1910. If the censored text-based data does not require any more censoring (step 1910, NO) the process 1900 may proceed to step 1912 where the censored text-based data is tested for need of modification from the user. If the censored text-based data requires censoring (step 1910, YES) the process 1900 may proceed back to step 1902. If the censored text-based data requires modifications (1912, YES) the user may modify the parameters of the censoring process, or and modify the censored text-based data in step 1908 and process 1900 may return to step 1906. For example, if CBM fails to censor a part of text-based data due to the presence of unrecognized characters, the user may remove characters and request another round of censoring process using the CBM. If the censored text-based data does not require any modifications (1912, NO) the censored text-based data may be output in step 1914, for example stored in database 170 or submitted to network 141.

In some embodiments, the user may select different types of CBMs for censoring text-based data in step 1902, and, in some embodiments, the user may select the various parameters for a CBM that may alter the censoring results of the CBM in step 1902. In some embodiments, in order to obtain the censored text, the user may select a user profile of receiving party 140 (not shown in FIG. 19). The user, for example can select from the drop down menu the type of profiles that may include "Administrator," "Supervisor," "End User," "Limited Information" and/or the like.

The foregoing description has been presented for purposes of illustration. It is not exhaustive and is not limited to precise forms or embodiments disclosed. Modifications and adaptations of the embodiments will be apparent from a consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based On the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from a consideration of the specification and practice of the embodiments disclosed herein. It is intended that the specification and examples be considered as an example only, with a true scope and spirit of the disclosed embodiments being indicated by the following claims.

What is claimed is:

1. A system for censoring text-based data comprising:
at least one processor;
at least one non-transitory memory storing application programming interface instructions that, when executed by the at least one processor cause the system to perform operations comprising:
storing a target pattern type;
storing a computer-based model for:
identifying a target data pattern corresponding to a target pattern type within text-based data;
identifying target characters within the target data pattern; and
censoring the target characters;
receiving text-based data;
retrieving the target pattern type;
identifying, within the received text-based data using the model, a first target data pattern corresponding to the target pattern type;
retrieving a profile associated with a receiving party, the profile containing a first one of a plurality of permission levels for the target pattern type;
accessing a token corresponding to the target data pattern, the token associating the target data pattern with:
the permission levels; and
context-based alternative user information, the context-based alternative user information corresponding to the plurality of permission levels and having a plurality of relative data sensitivities;
retrieving a first part of the context-based alternative user information, the first part of the context-based alternative user information being associated with the token and corresponding to:
first target characters within the target data pattern; and
the first permission level;
censoring the text-based data by replacing the first target characters, with the first part of the context-based alternative user information, the censored text-based data comprising an indication that the text-based data has been censored; and
transmitting the censored text-based data to the receiving party.

2. The system of claim 1, wherein:
storing and retrieving a target pattern type comprises storing and retrieving a plurality of target data types; and
storing a computer-based model comprises storing computer-based models for individual ones of the target pattern types.

3. The system of claim 1, wherein the operations further comprise:
receiving training data for the model, the training data comprising text-based data including comprising:
context data;
a plurality of second target data patterns containing second target characters embedded in the context data; and
counter character examples of the second target characters, the counter character examples corresponding to a data pattern, at least a portion of the data pattern forming a first one of the second target data patterns;
receiving validation data for the model, the validation data comprising:
text-based data;
a plurality of third target data patterns containing third target characters; and
a plurality of target probability values corresponding to the third target characters;
training the model based on the training data; and
validating the model based on the validation data by:
calculating an accuracy score based on a difference between a plurality of probability values generated by the model for the third target characters and the received target probability values; and
determining that the accuracy score exceeds a threshold score.

4. The system of claim 3, wherein the training data comprises second target characters are identified by a tag.

5. A method for censoring text-based data, the method comprising:
receiving a plurality of target pattern types;
obtaining a plurality of machine learning models for identifying target data patterns, the machine learning models corresponding to target pattern types, wherein at least one of the machine learning models is configured to perform operations comprising:
identifying, within text-based data, a first target data pattern corresponding to a first one of the target pattern types;
identifying first target characters within the first target data pattern; and
censoring the first target characters;
receiving text-based data;
identifying within the received text-based data, the first target data pattern corresponding to the first target pattern type using the selected machine learning models;
retrieving a profile associated with a receiving party, the profile containing a first one of a plurality of permission levels for the first target pattern type;
accessing a token corresponding to the first target data pattern, the token associating the first target data pattern with:

the permission levels; and context-based alternative user information, the context-based alternative user information corresponding to the permission levels and having a plurality of relative data sensitivities;

retrieving a first part of the context based alternative user information, the first part of the context-based alternative user information corresponding to:

the first target characters; and the first permission level; and modifying the text-based data by replacing the first target characters with the first part of the context-based alternative user information.

6. The method of claim 5 further comprising:

generating training data for the at least one machine learning model;

generating validation data for the at least one machine learning model, the validation data comprising a plurality of target probability values corresponding to second target characters;

training the at least one machine learning model using the training data;

validating the machine learning model using the validation data by:

calculating an accuracy score based on a difference between a plurality of probability values generated by the model for the second target characters and the target probability values; and determining that the accuracy score exceeds a threshold score; and receiving an approval of the at least one machine learning model from an administrator.

7. The method of claim 5, wherein the first target characters comprise synthetic data.

8. The method of claim 5, wherein the text-based data comprises randomly generated context data.

9. The method of claim 5, further comprising:

parsing the text-based data using a language parser; and labeling data objects of the text-based data with labels identifying parts of speech.

10. The method of claim 5, wherein the at least one of the machine learning models comprises a recurrent neural network.

11. A non-transitory computer-readable medium storing instructions that, when executed by at least one a processor, cause the processor to perform operations comprising:

receiving text-based data;

receiving a target pattern type;

generating training data, the training data comprising text-based data containing a plurality of target data patterns including target characters, the target data patterns corresponding to the target pattern type;

training a computer-based model using the training data, the model identifying:

a first one of the target data patterns, the first target data pattern corresponding to the target pattern type;

first target characters within the first target data pattern;

a second one of the target data patterns, the second target data pattern corresponding to the target pattern type; and second target characters within the second target data pattern;

validating the model by:

accessing validation data comprising a plurality of target probability values corresponding to third target characters;

calculating an accuracy score based on a difference between a plurality of probability values generated by the model for the third target characters and the target probability values; and determining that the accuracy score exceeds a threshold score; and retrieving a profile associated with a receiving party, the profile containing a first one of a plurality of permission levels corresponding to the target pattern type;

accessing a token corresponding to one of the first or second target data pattern, the token associating the one of the first or second target data pattern with:

the plurality of permission levels; and context-based alternative user information corresponding to the permission levels;

retrieving a first part of the context-based alternative user information associated with the token and corresponding to:

the one of the first or second target characters; and the first permission level;

censoring the text-based data by replacing the one of the first or second target characters, within the first and the second identified target data patterns, with the first part of the alternative user information; and transmitting the censored text-based data.

12. The computer-readable medium of claim 11, wherein the model comprises a plurality of neural networks, at least one of the neural networks being trained to:

identify the first and second target data patterns; and identify the first and second target characters.

13. The system of claim 1, wherein the first part of the alternative user information comprises information related to information represented by the target characters.

14. The system of claim 1, wherein retrieving the first part of the alternative user information comprises retrieving, for the token, a plurality of sets of substitution characters, each set forming at least one word, wherein:

the sets correspond to the permission levels;

none of the sets are identical; and at least one of the sets comprises substitute characters that are different from the first target characters.

15. The system of claim 14, wherein the words are generalizations of information represented by the target characters.

16. The system of claim 14 having at least three permission levels.

17. The system of claim 3, wherein the counter character examples comprise counter character examples formed by altering parts of a third target data pattern chosen from the second target data patterns.

18. The system of claim 17, wherein altering parts of the third target data pattern comprises replacing a plurality of characters in the target data pattern with randomly selected characters.

19. The system of claim 3, wherein second target characters comprise target characters identified by a first tag and the counter character examples comprise target characters identified by a second tag different from the first tag.

20. The method of claim 5, wherein the first part of the alternative user information comprises a word that is a generalization of information represented by the first target characters.

* * * * *